US010549430B2

(12) United States Patent
Nakata et al.

(10) Patent No.: US 10,549,430 B2
(45) Date of Patent: Feb. 4, 2020

(54) MAPPING METHOD, LOCALIZATION METHOD, ROBOT SYSTEM, AND ROBOT

(71) Applicant: Panasonic Intellectual Property Corporation of America, Torrance, CA (US)

(72) Inventors: Yohei Nakata, Osaka (JP); Kazuma Takeuchi, Osaka (JP); Masahiko Saito, Kanagawa (JP); Naoyuki Harada, Osaka (JP); Shuhei Matsui, Osaka (JP); Kensuke Wakasugi, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 296 days.

(21) Appl. No.: 15/825,159

(22) Filed: Nov. 29, 2017

(65) Prior Publication Data

US 2018/0079085 A1 Mar. 22, 2018

Related U.S. Application Data

(63) Continuation of application No. PCT/JP2016/003634, filed on Aug. 8, 2016.

(30) Foreign Application Priority Data

Aug. 28, 2015 (JP) .................................. 2015-169412
Jul. 6, 2016 (JP) .................................. 2016-134284

(51) Int. Cl.
*B25J 13/08* (2006.01)
*G05D 1/02* (2006.01)
(Continued)

(52) U.S. Cl.
CPC ........... *B25J 13/089* (2013.01); *B25J 9/1664* (2013.01); *B25J 9/1697* (2013.01); *G05D 1/024* (2013.01);
(Continued)

(58) Field of Classification Search
CPC ...... B25J 13/089; B25J 9/1697; B25J 9/1664; G05D 1/028; G05D 1/024; G05D 1/0274; G01C 21/206
(Continued)

(56) References Cited

U.S. PATENT DOCUMENTS

2003/0212472 A1* 11/2003 McKee ............... G05D 1/0274
700/245
2005/0182518 A1* 8/2005 Karlsson ............. G05D 1/0246
700/253
(Continued)

FOREIGN PATENT DOCUMENTS

JP 2012-111011 6/2012
JP 2012-248032 12/2012

OTHER PUBLICATIONS

International Search Report of PCT application No. PCT/JP2016/003634 dated Sep. 13, 2016.
(Continued)

*Primary Examiner* — Abby Y Lin
*Assistant Examiner* — Pum H Thang
(74) *Attorney, Agent, or Firm* — Greenblum & Bernstein, P.L.C.

(57) ABSTRACT

A mapping method includes: acquiring first map information created in advance, including information about a surrounding area of a mobile robot; acquiring second map information including information about the surrounding area by a sensor of the mobile robot; receiving third map information including information about the surrounding area from an environmental sensor node; (i) in the third map information, if a place exists in which an amount of change over time is equal to or greater than a certain threshold value, removing information about the place in each of the first and the second map information corresponding to that place, or alternatively, increasing the variance of information about (Continued)

the place in each of the first and the second map information corresponding to that place; and (ii) creating map information using the first and the second map information subjected to the removal or the variance increase.

11 Claims, 18 Drawing Sheets

(51) Int. Cl.
  *B25J 9/16* (2006.01)
  *G01C 21/20* (2006.01)

(52) U.S. Cl.
  CPC ............ *G05D 1/028* (2013.01); *G05D 1/0274* (2013.01); *G01C 21/206* (2013.01)

(58) Field of Classification Search
  USPC ........................................................ 700/245
  See application file for complete search history.

(56) References Cited

U.S. PATENT DOCUMENTS

| | | | |
|---|---|---|---|
| 2011/0082585 A1* | 4/2011 | Sofman | G05D 1/0274 700/259 |
| 2012/0213443 A1* | 8/2012 | Shin | G05D 1/0246 382/190 |
| 2013/0158865 A1* | 6/2013 | Na | G01C 21/005 701/448 |
| 2016/0129592 A1* | 5/2016 | Saboo | G06Q 50/28 700/248 |

OTHER PUBLICATIONS

Communication pursuant to Article 94(3) EPC, dated Nov. 15, 2018, from the European Patent Office (EPO) for the related European Patent Application No. 16841053.8.

Rex Wong, et al.: "Clutter-sensitive Data Association for Simultaneous Localization and Mapping in Robotic Wireless Sensor Networks", 2010 International Conference on Mechatronics and Automation (ICMA), IEEE, Piscataway, NJ, USA, Aug. 4-7, 2010, pp. 1976-1981, XP031764804.

* cited by examiner

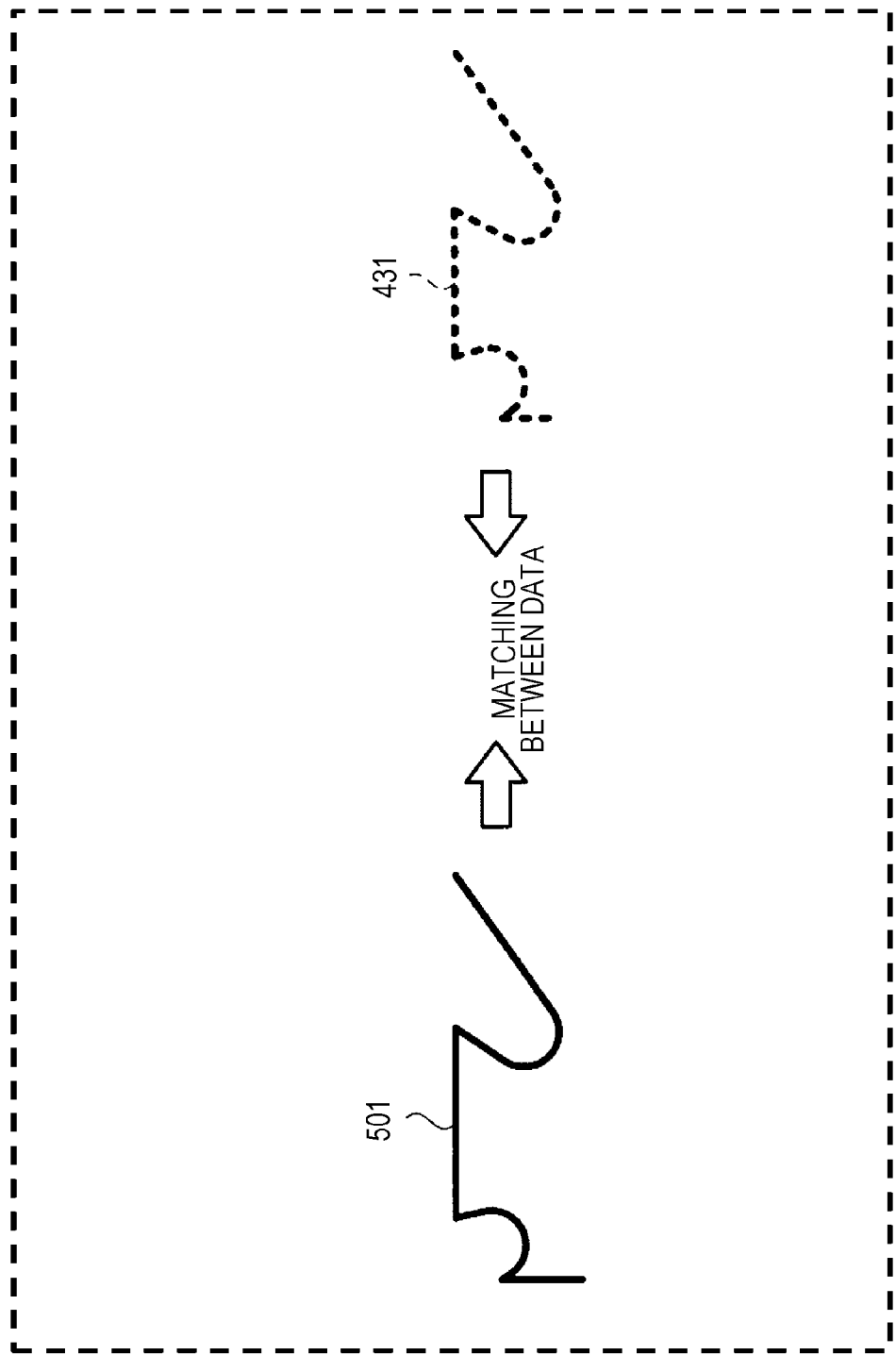

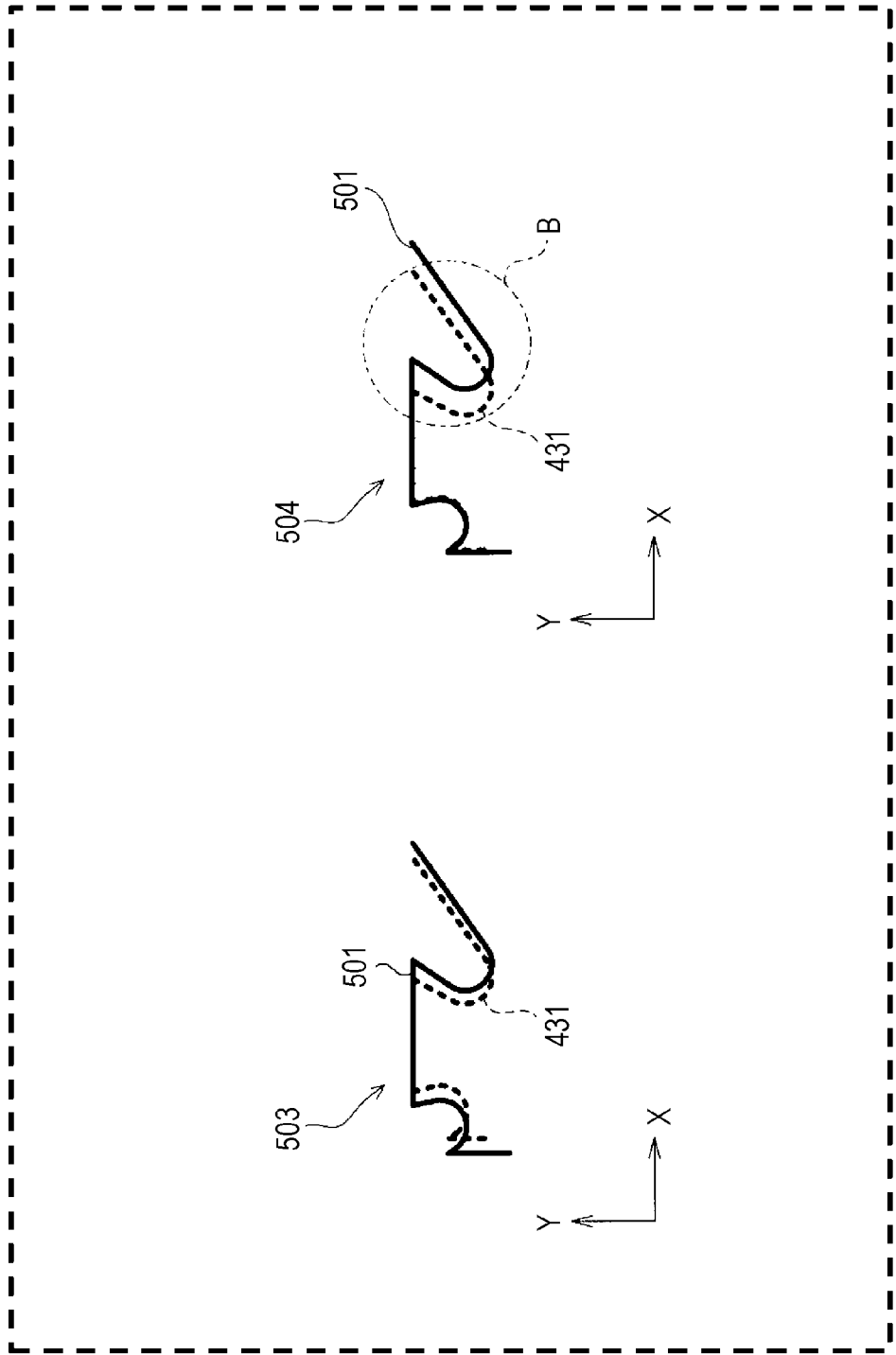

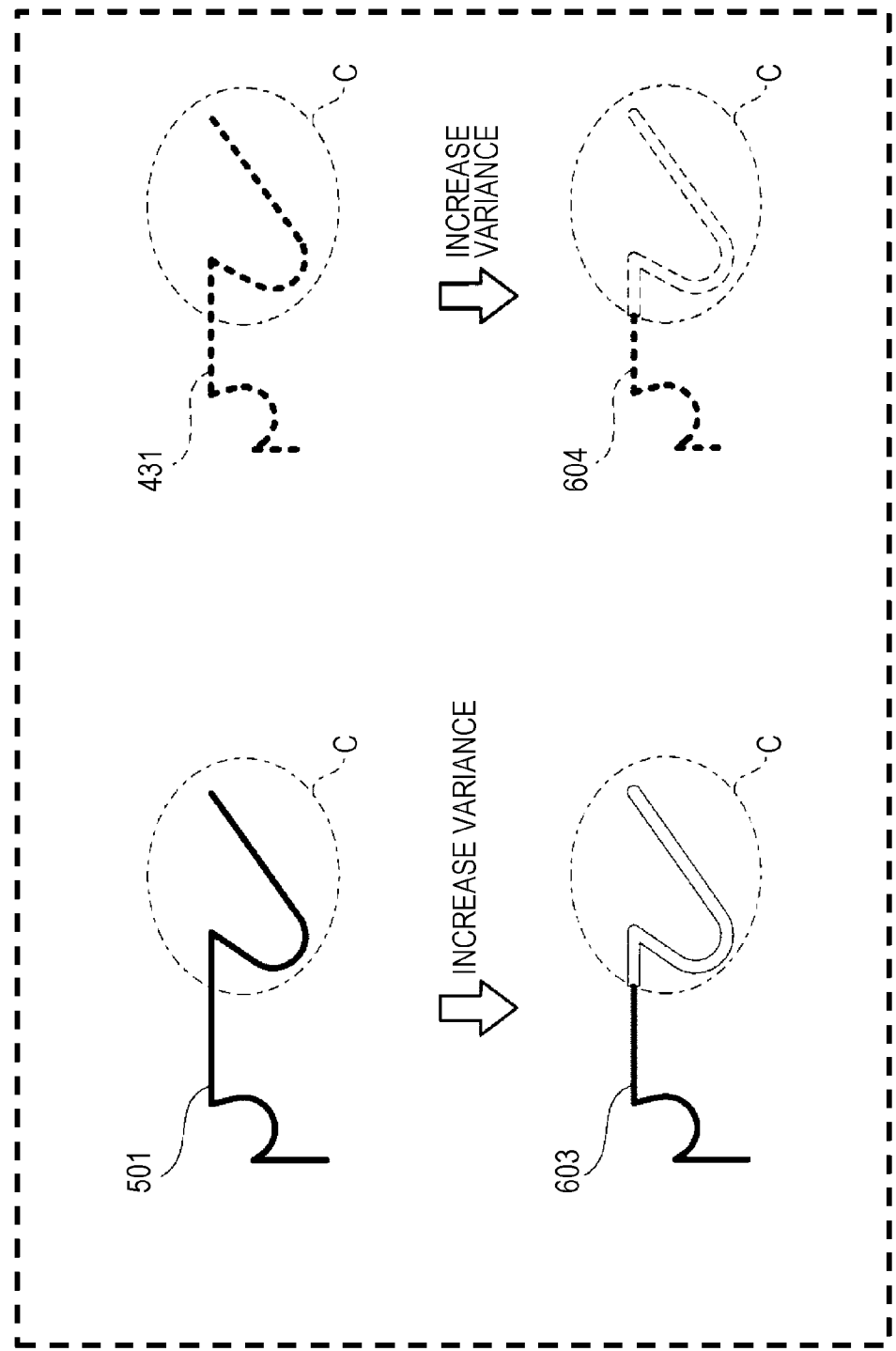

MAPPING METHOD, LOCALIZATION METHOD, ROBOT SYSTEM, AND ROBOT

BACKGROUND

1. Technical Field

The present disclosure relates to technology that conducts localization and environment map creation for a mobile robot, and more particularly, relates to a system of an environmental sensor installed in an environment and a mobile robot that links with the environmental sensor.

2. Description of the Related Art

For a mobile robot to move autonomously in an environmental space in which people and other machines are present, the mobile robot itself needs to correctly recognize its own location and orientation, as well as the surrounding environment. In the related art, a known technique for conducting such recognition is Simultaneous Localization and Mapping (SLAM) technology, which estimates the agents location while at the same time creating a map of the environment.

A mobile robot according to SLAM technology is equipped with an internal sensor, which is a sensor for learning the internal state of the mobile robot, and an external sensor, which is a sensor for learning the state of the external world.

With SLAM technology, first, a current location and orientation are estimated from internal sensor information. Next, from already-stored map information about the surrounding environment at the estimated location and orientation, the mobile robots (i) location, (ii) orientation, (iii) uncertainty of location, and (iv) uncertainty of orientation are predicted. Next, observation information obtained by the external sensor is compared to the information predicted from the internal sensor information. Next, from the likelihood of each set of information computed by the comparison, a weighting of the information from the internal sensor and the external sensor is decided. Subsequently, information about the weighting of the data from the internal sensor and the external sensor is used to conduct a process of updating the current location and orientation as well as the map information.

Japanese Unexamined Patent Application Publication No. 2012-248032 discloses a robot system that evaluates the reliability of multiple estimators that conduct localization based on the outputs from multiple different sensors, and integrates the localization information from the multiple estimators according to the reliability.

Japanese Patent No. 5617562 discloses a mobile robot that links with an environmental sensor to move while avoiding collisions with people and obstacles, without interfering with the activity of the people. The environmental sensor is multiply disposed to detect the locations of all people present in the environment.

SUMMARY

In one general aspect, the techniques disclosed here feature a mapping method of a mobile robot that conducts mapping using at least one or a plurality of an environmental sensor node, the mapping method including: acquiring first map information created in advance, including information about a surrounding area of the mobile robot; acquiring second map information including information about the surrounding area of the mobile robot by an external sensor onboard the mobile robot; receiving third map information including information about the surrounding area of the mobile robot from the environmental sensor node; (i) in the third map information, if information exists about a place in which an amount of change over time is equal to or greater than a certain threshold value, conducting a removal process of removing information about a place in the first map information and information about a place in the second map information that correspond to the place in which the amount of change over time is equal to or greater than the certain threshold value in the third map information, or alternatively, conducting a variance-increasing process of increasing a variance of each of information about a place in the first map information and information about a place in the second map information that correspond to the place in which the amount of change over time is equal to or greater than the certain threshold value in the third map information; (ii) matching the first map information and the second map information after being subjected to the removal process or the variance-increasing process, and generating map information based on the matching result; and (iii) updating the first map information to the map information generated based on the matching result.

Note that these general or specific aspects may also be realized by a system, method, integrated circuit, computer program, or computer-readable recording medium such as a CD-ROM disc, and may also be realized by an arbitrary combination of a system, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is an explanatory diagram illustrating an example of data matching during a mapping and localization process;

FIG. 5B is a diagram illustrating an example of a matching result;

FIG. 7A is a diagram illustrating an example of a data variance-increasing process;

Figure 1:
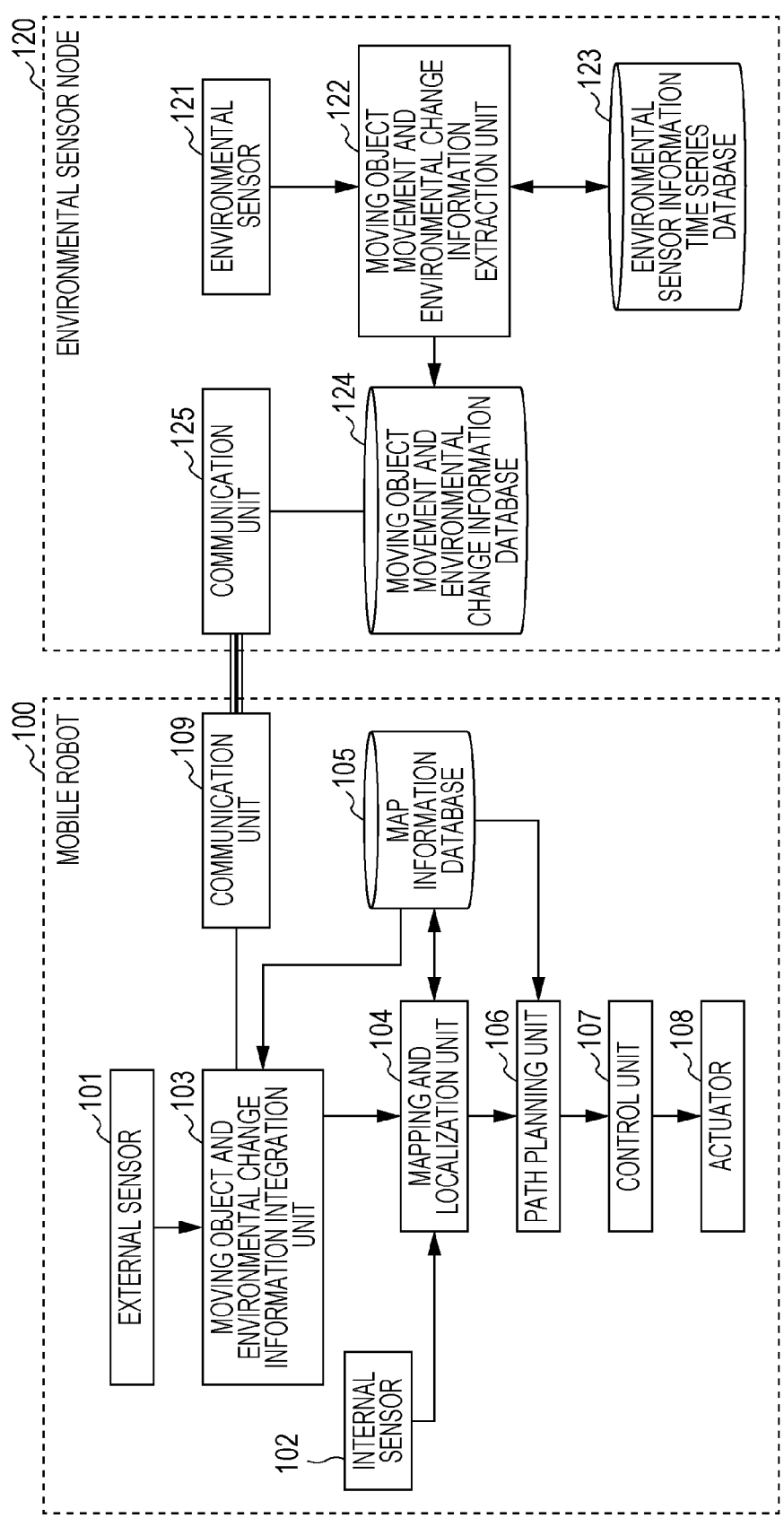
FIG. 1 is a block diagram illustrating an example of a configuration of a robot system according to Embodiment 1.

DETAILED DESCRIPTION (Underlying Knowledge Forming Basis of the Present Disclosure)

With SLAM technology, there is a problem in that, if there is an environmental change in an area within the sensing range of the external sensor of the mobile robot during mapping or localization, an error occurs in the mapping and localization, and estimation may no longer be conducted correctly. In spaces with large environmental changes due to people and other moving objects, such as an office or inside a home, or in spaces where many people come and go, such as a rail station or a shopping mall, mapping with SLAM technology is difficult because large disturbances, or in other words large environmental changes, occur frequently. As a result, using SLAM technology to plan a route that avoids people and obstacles becomes difficult.

Furthermore, for spaces with large environmental changes as discussed above, in the mapping and localization process, the convergence worsens for estimated values according to the least squares method in the part of the process that compares the information obtained by the external sensor to the predicted information, and the computational complexity increases.

In methods of the related art, such as PTL 1 and PTL 2, conducting mapping and localization accurately and robustly, even in a space with large environmental changes, is not investigated. For this reason, moderating increases in the required computational complexity has not been possible.

The present disclosure proposes a localization method, a robot system, and a mobile robot that conduct mapping and localization accurately and robustly, even in a space with large environmental changes.

A mapping method according to the present disclosure is a mapping method of a mobile robot that conducts mapping using at least one or a plurality of an environmental sensor node, the mapping method comprising: acquiring first map information created in advance, including information about a surrounding area of the mobile robot; acquiring second map information including information about the surrounding area of the mobile robot by an external sensor onboard the mobile robot; receiving third map information including information about the surrounding area of the mobile robot from the environmental sensor node; (i) in the third map information, if information exists about a place in which an amount of change over time is equal to or greater than a certain threshold value, conducting a removal process of removing information about a place in the first map information and information about a place in the second map information that correspond to the place in which the amount of change over time is equal to or greater than the certain threshold value in the third map information, or alternatively, conducting a variance-increasing process of increasing a variance of each of information about a place in the first map information and information about a place in the second map information that correspond to the place in which the amount of change over time is equal to or greater than the certain threshold value in the third map information; (ii) matching the first map information and the second map information after being subjected to the removal process or the variance-increasing process, and generating map information based on the matching result; and (iii) updating the first map information to the map information generated based on the matching result.

A configuration is also possible in which, in the third map information, if information exists about a place in which the amount of change over time between a first timing and a second timing is equal to or greater than the certain threshold value, the removal process is conducted if a time difference between the first timing and the second timing is within a range between a first time and a second time longer than the first time, and the variance-increasing process is conducted if the time difference between the first timing and the second timing is equal to or greater than the second time.

A configuration is also possible in which, in the third map information, if information exists about a place in which the amount of change over time between the first timing and the second timing is equal to or greater than the certain threshold value, if the time difference between the first timing and the second timing is less than or equal to the first time, the removal process and the variance-increasing process are not conducted, the first map information and the second map information are matched, and map information is generated based on the matching result.

A configuration is also possible in which, in the third map information, if information does not exist about a place in which the amount of change over time is equal to or greater than the certain threshold value, the first map information and the second map information are matched, and map information is generated based on the matching result.

A configuration is also possible in which the variance-increasing process is a process of increasing an indefiniteness of information about a corresponding place in the first map information and a corresponding place in the second map information.

A configuration is also possible in which the third map information includes information about an existence probability of an object near the environmental sensor node, and the amount of change over time is an amount of change in the existence probability. A configuration is also possible in which the first map information, the second map information, and the third map information are coordinate information in a two-dimensional coordinate system or coordinate information in a three-dimensional coordinate system, and before conducting the matching, a coordinate conversion process is conducted to convert the respective coordinate systems of the first map information, the second map information, and the third map information to a common coordinate system.

A localization method according to an aspect of present disclosure is a localization method of a mobile robot that conducts localization using at least one sensor node, the localization method comprising: acquiring first map information created in advance, including information about a surrounding area of the mobile robot; acquiring second map information including information about the surrounding area of the mobile robot by an external sensor onboard the mobile robot; receiving third map information including information about the surrounding area of the mobile robot from an environmental sensor node; (i) in the third map information, if information exists about a place in which an amount of change over time is equal to or greater than a certain threshold value, conducting a removal process of removing information about a place in the first map information and information about a place in the second map information that correspond to the place in which the amount of change over time is equal to or greater than the certain threshold value in the third map information, or alternatively, conducting a variance-increasing process of increasing a variance of each of information about a place in the first map information and information about a place in the second map information that correspond to the place in which the amount of change over time is equal to or greater than the certain threshold value in the third map information; (ii) matching the first map information and the second map information after being subjected to the removal process or the variance-increasing process, and generating map information based on the matching result; (iii) updating the first map information to the map information generated based on the matching result; and (iv) estimating a location of the mobile robot in the updated first map information, based on the updated first map information, and a detection result of an internal sensor that detects at least one of a position and an orientation of the mobile robot.

Another possible configuration comprises: calculating a movement path based on the updated first map information and the estimated location; and causing the mobile robot along the movement path.

A robot system according to an aspect of the present disclosure is a robot system comprising: at least one environmental sensor node; and a mobile robot, wherein the environmental sensor node acquires third map information including information about a surrounding area of the mobile robot, and the mobile robot includes a database recording first map information created in advance, including information about a surrounding area of the mobile robot, an external sensor that acquires second map information including information about the surrounding area of the mobile robot, a communicator that communicates with the environmental sensor node to acquire the third map information, and an information processor that (i) in the third map information, if information exists about a place in which an amount of change over time is equal to or greater than a certain threshold value, conducts a removal process of removing information about a place in the first map information and information about a place in the second map information that correspond to the place in which the amount of change over time is equal to or greater than the certain threshold value in the third map information, or alternatively, conducts a variance-increasing process of increasing a variance of each of information about a place in the first map information and information about a place in the second map information that correspond to the place in which the amount of change over time is equal to or greater than the certain threshold value in the third map information, (ii) matches the first map information and the second map information after being subjected to the removal process or the variance-increasing process, and generates map information based on the matching result, and (iii) updates the first map information recorded in advance to the map information generated based on the matching result.

A mobile robot according to an aspect of the present disclosure comprises: a database recording first map information created in advance, including information about a surrounding area of the mobile robot; an external sensor that acquires second map information including information about the surrounding area of the mobile robot; a communicator that acquires third map information including information about the surrounding area of the mobile robot by communicating with at least one environmental sensor node, which is external to the mobile robot and which acquires the third map information; and an information processor that (i) in the third map information, if information exists about a place in which an amount of change over time is equal to or greater than a certain threshold value, conducts a removal process of removing information about a place in the first map information and information about a place in the second map information that correspond to the place in which the amount of change over time is equal to or greater than the certain threshold value in the third map information, or alternatively, conducts a variance-increasing process of increasing a variance of each of information about a place in the first map information and information about a place in the second map information that correspond to the place in which the amount of change over time is equal to or greater than the certain threshold value in the third map information, (ii) matches the first map information and the second map information after being subjected to the removal process or the variance-increasing process, and generates map information based on the matching result, and (iii) updates the first map information recorded in advance to the map information generated based on the matching result.

Note that these general or specific aspects may also be realized by a system, method, integrated circuit, computer program, or computer-readable recording medium such as a CD-ROM disc, and may also be realized by an arbitrary combination of a system, method, integrated circuit, computer program, and recording medium.

The embodiments described hereinafter all illustrate examples of the present disclosure. Features such as numerical values, shapes, structural elements, steps, and the ordering of steps indicated in the following embodiments are merely examples, and are not intended to limit the present disclosure. In addition, among the structural elements in the following embodiments, structural elements that are not described in the independent claim indicating the broadest concept are described as arbitrary or optional structural elements. Furthermore, the individual contents in all of the embodiments may also be combined.

Hereinafter, embodiments will be described with reference to the drawings.

Embodiment 1

FIG. 1 is a block diagram illustrating an example of a configuration of a robot system according to Embodiment 1. The robot system includes a mobile robot 100 and an environmental sensor node 120.

The mobile robot 100 includes an external sensor 101, an internal sensor 102, an information processing unit (moving object and environmental change information integration unit 103, mapping and localization unit 104, map information database 105, and path planning unit 106), a control unit 107, an actuator 108, and a communication unit 109.

Also, as a means of moving the mobile robot 100, the mobile robot 100 includes two or four wheels, or alternatively, two or more legs, for example. These wheels or legs operate by motive force from the actuator 108, and are thereby able to move the mobile robot 100. The legs of the mobile robot 100 discussed above desirably are equipped with one or more joints. Furthermore, as a means of moving the mobile robot 100, it is desirable to include one or more arms for wearing or gripping a sensor or arbitrary object. The one or more arms of the mobile robot 100 discussed above desirably are equipped with one or more joints.

Additionally, the mobile robot 100 is equipped with one or more CPUs, one or more primary memories, and one or more auxiliary memories (not illustrated).

The one or more CPUs of the mobile robot 100 discussed above conduct various computational processes performed by units such as the moving object and environmental change information integration unit 103, the mapping and localization unit 104, the path planning unit 106, and the control unit 107 described hereinafter.

The one or more primary memories of the mobile robot 100 discussed above are memory devices directly accessible by the CPU or CPUs discussed above, and may be configured by memory such as DRAM, SRAM, flash memory, ReRAM, FeRAM, MRAM, STT-RAM, or PCRAM.

The one or more auxiliary memories of the mobile robot 100 discussed above are memory devices that persistently save, copy, or backup the content of the one or more primary memories discussed above, and may be configured by an HDD, flash memory, an optical disc, a magnetic disk, or the like.

The external sensor 101 is a sensor that detects information about the surrounding environment of the mobile robot 100, and detects the two-dimensional shape or three-dimensional shape as well as the color and material of the surrounding environment. The external sensor 101 may be configured by a sensor such as a laser rangefinder (LRF), Laser Imaging Detection and Ranging (LIDAR), a camera, a depth camera, a stereo camera, sonar, radar, or a combination of all of the above, for example. Herein, the information about the surrounding environment acquired by the external sensor 101 includes information related to coordinates (coordinate information).

The internal sensor 102 is a sensor that detects the location and orientation of the mobile robot 100. The internal sensor 102 is able to detect at least one of the absolute values of three directional components (for example, the X-axis directional component, the Y-axis directional component, and the Z-axis directional component in an X-Y-Z orthogonal coordinate system) for each of the movement distance, velocity, acceleration, angular velocity, and orientation of the mobile robot 100. Additionally, the internal sensor 102 may also be able to detect the absolute values of the velocity, acceleration, angular velocity, orientation, and torque for each joint of the one or more arms and two or more legs of the mobile robot 100. The internal sensor 102 may be configured by a sensor such as an acceleration sensor, an angular velocity sensor, an encoder, a geomagnetic sensor, a barometric or hydraulic sensor, a torque sensor, or a combination of the above.

The moving object and environmental change information integration unit 103 acquires information detected by the external sensor 101 onboard the mobile robot 100 (second map information), and also acquires moving object movement and environmental change information extracted in the environmental sensor node 120 (third map information) via the communication unit 109. Additionally, the moving object and environmental change information integration unit 103 uses the moving object movement and environmental change information extracted by the environmental sensor node 120 to conduct a process of removing information about a place that changes dynamically in a time series from the information detected by the external sensor 101 (removal process), or a process of lowering the trustworthiness of information about that place (variance-increasing process). The specific content of the removal process and the variance-increasing process will be discussed later.

The mapping and localization unit 104 acquires at least one of the absolute values of the three directional components for each of the movement distance, velocity, acceleration, angular velocity, and orientation of the mobile robot 100 obtained by the internal sensor 102. Also, the mapping and localization unit 104 acquires information about the surrounding environment of the mobile robot 100 from the external sensor 101, which has been processed by the moving object and environmental change information integration unit 103 (that is, already subjected to the removal process or the variance-increasing process). Subsequently, the mapping and localization unit 104 estimates the location of the mobile robot 100 and generates map information from the acquired information at the same time by a filtering process. Note that the location estimation and the map information generation may also not be conducted at the same time. The filtering process may be made up of the respective techniques of the Kalman filter, the extended Kalman filter, the unscented Kalman filter, a particle filter, and the Rao-Blackwellized particle filter. Additionally, the mapping and localization unit 104 saves the generated map in the map information database 105. If a map for the relevant environment already exists, an update of the map information is conducted using the generated map in conjunction with the map information saved in the map information database 105, and the updated map information is then saved in the map information database 105.

The map information database 105 saves map information generated and updated by the mapping and localization unit 104 (first map information). The saved map information is used by each of the mapping and localization unit 104 and the path planning unit 106. The map information database 105 is disposed in a primary memory or an auxiliary memory of the mobile robot 100.

The path planning unit 106 uses map information saved in the map information database 105 and information about the location of the mobile robot 100 estimated by the mapping and localization unit 104 to plan a path by which to move over the map from the current location. The path to be planned is a path that minimizes the path cost. The path cost may be expressed by the total movement time, the total movement distance, the total energy used for movement, the total sum congestion on the path, or a combination of all of the above.

The control unit 107 controls the execution of movement operations of the mobile robot 100 in the environment where the mobile robot actually operates, for the path planned by the path planning unit 106.

The actuator 108 drives the wheels or the like, for example, based on control commands from the control unit 107, and thereby actually moves the mobile robot 100.

The communication unit 109 is equipped with a function of conducting one-to-many or many-to-many communication, in a wired or wireless manner. The communication unit 109 queries the environmental sensor node 120 about whether or not moving object movement and environmental change information exists for a specified place.

The environmental sensor node 120 includes an environmental sensor 121, a moving object movement and environmental change information extraction unit 122, an environmental sensor information time series database 123, a moving object movement and environmental change information database 124, and a communication unit 125.

The environmental sensor 121 is a sensor that detects information about the surrounding environment of the environmental sensor node 120. The information about the surrounding environment includes information related to the two-dimensional shape or three-dimensional shape as well as the color and material of the surrounding environment.

Figure 2:
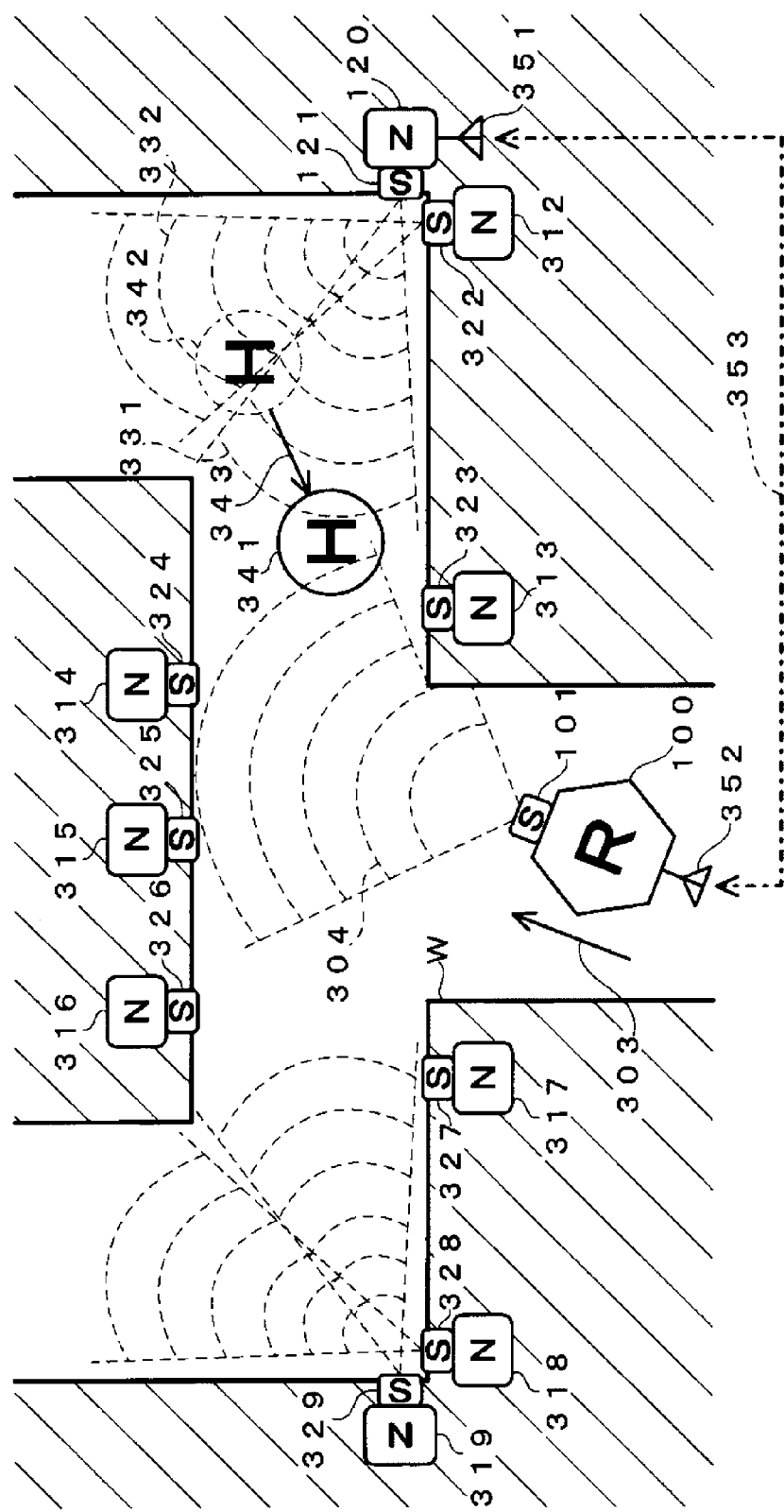
FIG. 2 is a diagrammatic view illustrating an example of an environment in which environmental sensor nodes and a mobile robot are present.

FIG. 2 is a diagrammatic view illustrating an example of an environment in which the environmental sensor node 120, multiple environmental sensor nodes 312 to 319 similar to the environmental sensor node 120, and the mobile robot 100 are present.

Note that even if the signs differ in the configurations illustrated in FIGS. 1 and 2, elements with the same name are taken to have the same configuration.

The environmental sensor nodes 120 and 312 to 319 are equipped with environmental sensors 121 and 322 to 329, respectively. The environmental sensor nodes 120 and 312 have detection ranges 331 and 332, respectively. The detection ranges of the environmental sensor nodes 313 to 319 are not illustrated for the sake of simplicity in the diagram, but the environmental sensor nodes and the environmental sensors are installed so that the possible movement space of the mobile robot is entirely detectable by the respective environmental sensor nodes.

Additionally, the environmental sensors 121 and 322 to 329 of the environmental sensor nodes 120 and 312 to 319 may be configured by a sensor such as a laser rangefinder (LRF), Laser Imaging Detection and Ranging (LIDAR), a camera, a depth camera, a stereo camera, sonar, radar, a pyroelectric infrared sensor, an infrared time of flight (ToF) sensor, or a combination of all of the above, for example.

As illustrated in FIG. 2, the mobile robot 100 is equipped with the external sensor 101, and is moving in a movement direction 303.

At the timing illustrated in FIG. 2, the detection range of the external sensor 101 is 304.

Also, FIG. 2 illustrates a current location 341 of a person/moving object, a past location 342 of a person/moving object, and a current movement direction 343 of a person/moving object. Although discussed in detail later, the time-series environmental change caused by the person/moving object moving from the location 342 to the location 341 is extracted as moving object movement and environmental change information by the environmental sensor nodes 120, 312, 313, and 314.

The information about the surrounding environment acquired by the environmental sensor 121 includes information related to coordinates (coordinate information).

The moving object movement and environmental change information extraction unit 122 saves information about the surrounding environment detected by the environmental sensor 121 in the environmental sensor information time series database 123, in the form of a pair of detection information and a detection timing. For example, the detection timing is expressed by a time. The moving object movement and environmental change information extraction unit 122 also calculates the changed place in the surrounding environment, the changed shape, the magnitude of the change, and the time taken for the change, based on multiple pairs of a detection timing and detection information following a time series saved in the environmental sensor information time series database 123. Subsequently, the moving object movement and environmental change information extraction unit 122 saves the changed place in the surrounding environment, the changed shape, the magnitude of the change, and the time taken for the change in the moving object movement and environmental change information database 124 as moving object movement and environmental change information. Note that the moving object movement and environmental change information may also not include all of the changed place in the surrounding environment, the changed shape, the magnitude of the change, and the time taken for the change, but instead include only a subset of the above information, or include other information.

The environmental sensor information time series database 123 saves information about the surrounding environment in a time series detected by the environmental sensor 121 and acquired by the moving object movement and environmental change information extraction unit 122, in pairs of detection information and a detection timing. The saved information is used to extract moving object movement and environmental change information by the moving object movement and environmental change information extraction unit 122.

The moving object movement and environmental change information database 124 saves moving object movement and environmental change information computed by the moving object movement and environmental change information extraction unit 122. The saved moving object movement and environmental change information is transmitted to the mobile robot 100 by the communication unit 125 after receiving a query from the communication unit 109 of the mobile robot 100.

The communication unit 125 receives a query from the communication unit 109 of the mobile robot 100 about whether or not moving object movement and environmental change information exists, searches the moving object movement and environmental change information database 124, and transmits the moving object movement and environmental change information to the mobile robot 100 by wired or wireless communication.

Figure 3A:
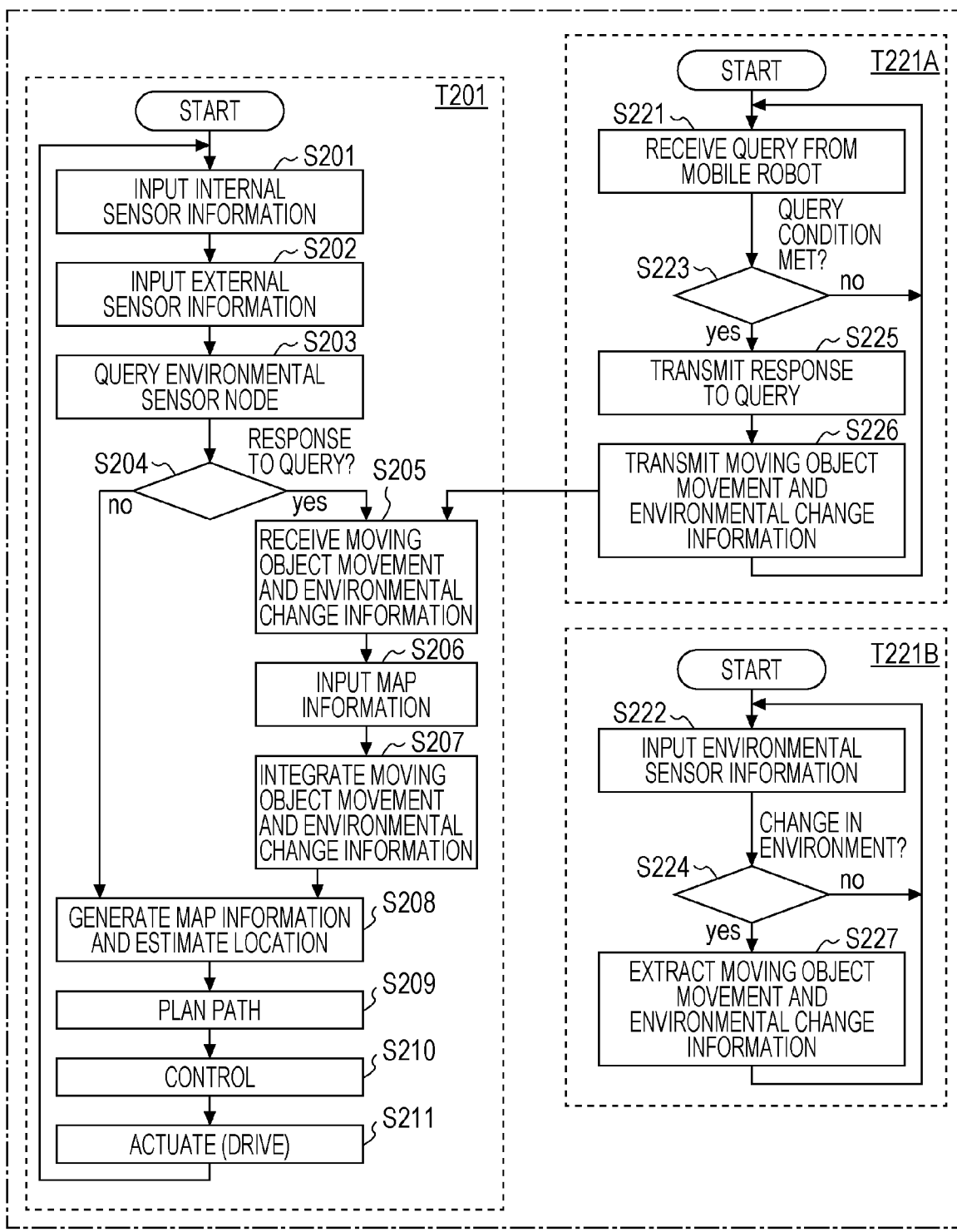
FIG. 3A is a flowchart illustrating an example of a process by a robot system.

Next, the flows of processes in the robot system will be described with reference to FIGS. 2, 3A, and 3B. FIG. 3A is a flowchart illustrating an example of a process by a robot system. T201 indicates a process flow of the mobile robot 100, while T221A and T221B indicates a process flow of the environmental sensor node 120.

First, in step S201 in FIG. 3A, the internal sensor 102 acquires information. At this point, the information to acquire is the absolute values of the three directional components for each of the movement distance, velocity, acceleration, angular velocity, and orientation of the mobile robot 100.

Next, in step S202, the external sensor 101 acquires information about the surrounding environment of the mobile robot 100. The information about the surrounding environment at the timing illustrated in FIG. 2 is information detected by the external sensor 101 for the detection range 304. At this point, the information to acquire includes information related to the two-dimensional or three-dimensional shape as well as the color and material of the surrounding environment.

Next, in step S203, the mobile robot 100 queries the environmental sensor nodes 120 and 312 to 319 via the communication unit 109 about whether or not moving object movement and environmental change information exists in a specified time period in a specified place having an arbitrary two-dimensional or three-dimensional size, and waits a certain time for a response to the query. At this point, the time and place may be specified in advance as a time of arbitrary length and a place of arbitrary (fixed) size by a user who manages the mobile robot 100. Additionally, the mobile robot may also modify and specify the size of the place and the length of the time depending on the situation.

In addition, the query from the mobile robot 100 may also be issued to all other mobile robots and other environmental sensor node that the mobile robot 100 is able to communicate with. The mobile robot 100 is able to receive responses and moving object movement and environmental change information from all mobile robots and environmental sensor nodes. Additionally, queries from the mobile robot 100 may be issued at the same time or sequentially to multiple environmental sensor nodes (or multiple other mobile robots).

Next, in step S204, the communication unit 109 determines whether or not there is a response from the environmental sensor nodes 120 and 312 to 319 in response to the query in step S203. If there are one or more responses, the process proceeds to step S205, whereas if there are no responses, the process proceeds to step S208.

Next, in step S205, the communication unit 109 receives moving object movement and environmental change information from the environmental sensor nodes 120 and 312 to 319, all other environmental sensor nodes, and all other mobile robots. Note that the communication unit 109 may also receive moving object movement and environmental change information from only a specific environmental sensor node among the environmental sensor nodes 120 and 312 to 319. The communication unit 109 may also acquire information from only environmental sensor nodes having environmental change information regarding the place specified in step S203.

In step S206, the moving object and environmental change information integration unit 103 acquires, from the map information database 105, map information (first map information) to use in the next step S207, which includes information about the place corresponding to the place where the moving object movement and environmental change information received in step S205 exists.

Figure 3B:
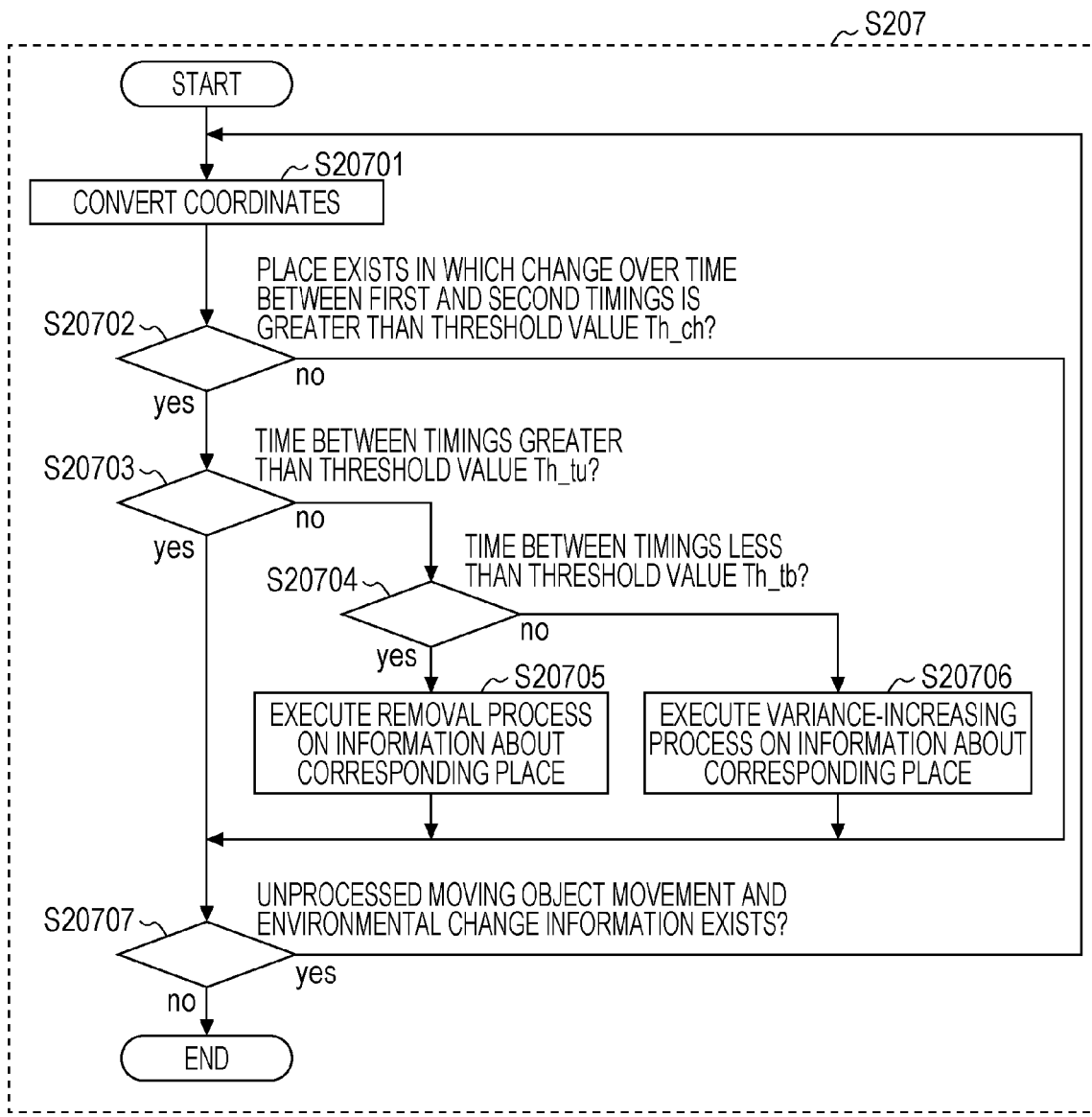
FIG. 3B is a flowchart illustrating an example of a process by a moving object movement and environmental change information integration unit.

Meanwhile, FIG. 3B is a flowchart illustrating an example of a process of the robot system, and more specifically, is a flowchart illustrating an example of the process in step S207. The specific content of step S207, namely, the detailed steps from step S20701 to step S20706, will be described with reference to FIG. 3B.

In step S207, the moving object and environmental change information integration unit 103 conducts a process of integrating the one or more sets of moving object movement and environmental change information extracted in the environmental sensor nodes 120 and 312 to 319 with the information acquired by the external sensor 101 in step S202 and the map information acquired in step S206.

First, in step S20701, the moving object and environmental change information integration unit 103 conducts a coordinate conversion of converting the coordinate system of the information about the surrounding environment acquired by the external sensor 101 in step S202 and the coordinate system of the moving object movement and environmental change information transmitted from the environmental sensor nodes 120 and 312 to 319 to the coordinate system of the map information acquired in step S206. Each of the coordinate systems is converted to a common coordinate system.

Next, in step S20702, the moving object and environmental change information integration unit 103 determines whether or not a place exists in which the magnitude of the change over time between different timings related to the shape of the moving object movement and environmental change information is greater than a threshold value Th_ch.

In the case of the present embodiment, the "change over time" relates to the existence probability at each point, which is the probability that an object exists at each point in a two-dimensional space or a three-dimensional space, for example. Specifically, the absolute value of the difference between the existence probability at a first timing and the existence probability at a second timing chronologically after the first timing is computed for each point, and the respective absolute values of the difference for each the points are added together to obtain a value (the sum of absolute differences). In other words, this value is the amount of change in the existence probability that changed over time between the first timing and the second timing. Additionally, the first timing and the second timing may be clock times, or may be elapsed times since the robot system started running.

In addition, the change over time related to shape may also be the sum of squared differences (SSD) or the sum of absolute transformed differences (SATD) for each point, the mean absolute difference (MAD), the mean square difference (MSD), or a difference of feature vectors, such as the image features SIFT, SURF, and HoG. Additionally, the change over time related to shape may also be a difference of bag-of-features (BoF) feature vectors generated using the above feature vectors, for example.

The configuration of the specific value of the threshold value Th_ch differs depending on the standard of the amount of change to be used, and the situation. As an example, in a 10 m×10 m×10 m space, the change when a 100 mm×100 mm×100 mm object moves 20 mm conceivably may be set as the threshold value Th_ch. However, the configuration of the specific value of the threshold value Th_ch is not limited to the above example.

If there exists a place in which the magnitude of the change over time between different timings is greater than the threshold value Th_ch, the process proceeds to step S20703. Otherwise, the process proceeds to step S20707.

Next, in step S20703, the moving object and environmental change information integration unit 103 determines whether or not the time difference between the timings for which the change over time related to the shape of the moving object movement and environmental change information is greater than the threshold value Th_ch is greater than a threshold value Th_tu (first time). If greater than the threshold value Th_tu, the process proceeds to step S20707. The time difference being greater than the certain threshold value Th_tu means that the relevant moving object movement and environmental change information is not a temporary environmental change due to a disturbance, but instead may be considered to be a semi-permanent or permanent change of the environment due to the movement of a stationary object or the like, and the changed portion of the environment is handled as a new map. For example, a layout change when the furniture or the like in a room is moved corresponds to the above, and a change with a large time difference, like a layout change, is treated as a new map. If the time difference is less than or equal to the threshold value Th_tu, the process proceeds to step S20704.

Next, in step S20704, the moving object and environmental change information integration unit 103 determines whether or not the time difference between the timings for which the change over time related to the shape of the moving object movement and environmental change information is greater than the threshold value Th_ch is less than a threshold value Th_tb (second time).

If less than the threshold value Th_tb, in step S20705, the moving object and environmental change information integration unit 103 executes a removal process of removing the information about the place in the information about the surrounding environment (second map information) acquired by the external sensor 101 of the mobile robot 100 and the information about the place in the map information (first map information) acquired in step S206 which correspond to the place in which the change over time in the moving object movement and environmental change information (third map information) is greater than the threshold value Th_ch. This removal process of removing information will be discussed in detail later.

On the other hand, if equal to or greater than the threshold value Th_tb, in step S20706, the moving object and environmental change information integration unit 103 executes a variance-increasing process of increasing the variance of each of the information about the place in the information about the surrounding environment (second map information) acquired by the external sensor 101 of the mobile robot 100 and the information about the place in the map information (first map information) acquired in step S206 which correspond to the place in which the change over time in the moving object movement and environmental change information (third map information) is greater than the threshold value Th_ch. Note that the threshold value Th_tb is a value that is greater than the threshold value Th_tu. For example, the increase in the variance is calculated by multiplying the variance V by a constant a greater than 1 (a×V).

Herein, the "variance of information" refers to an indicator expressing the inconsistency or indefiniteness of the information. With regard to the information about the surrounding environment, a small variance means that in the space of the surrounding environment, there is a high probability that a target of detection exists near an expected value. On the other hand, a large variance means that there is a low probability that a target of detection exists near an expected value, and the distribution of the probability over which the target of detection may possibly exist becomes more spread out in the space.

Also, the "variance-increasing process" of information refers to increasing the inconsistency or indefiniteness of the information, or in other words, refers to lowering the trustworthiness of the information. This variance-increasing process of increasing the variance of information will be discussed in detail later.

Note that in step S20704, it is determined whether or not the time difference between the timings for which the change over time related to the shape of the moving object movement and environmental change information is greater than the threshold value Th_ch is less than a threshold value Th_tb, but the process is not limited thereto. For example, it may also be determined whether or not the magnitude of the change over time related to the shape of the moving object movement and environmental change information is greater than a new threshold value different from the threshold value Th_ch. In other words, if the magnitude of the change over time related to the shape of the moving object movement and environmental change information is greater than the new threshold value (Yes), the process proceeds to step S20705, and if not (No), the process proceeds to step S20706. Herein, the new threshold value is a value higher than the threshold value Th_ch. In other words, the case of Yes in step S20704 is a case in which the change is greater than the negative case (No), and thus the process of removing the moving object movement and environmental change information from the external sensor information and map information becomes valid.

Next, in step S20707, the moving object and environmental change information integration unit 103 determines whether or not the moving object and environmental change information integration unit 103 has not processed a set of received moving object movement and environmental change information related to one or more places, in other words, whether or not unprocessed moving object movement and environmental change information exists. If unprocessed moving object movement and environmental change information exists, the process returns to step S20701, and the process continues until there is no more unprocessed moving object movement and environmental change information. If unprocessed moving object movement and environmental change information does not exist, the process proceeds to step S208.

Returning to FIG. 3A, in step S208, the generation of map information and the estimation of the location of the mobile robot 100 (including a matching process) are conducted. If there is a response from the environmental sensor node 120 in step S204, the mapping and localization unit 104 conducts the generation of map information and the estimation of the location of the mobile robot 100 using the information acquired by the external sensor 101 and resulting from the integration of moving object movement and environmental change information in step S207, and the information acquired by the internal sensor 102 in step S201. At this point, during the estimation of the location, the map information and the sensor data acquired by the external sensor are checked against each other (matching process), a search is conducted for a transform having a high similarity, and the transform having the highest similarity is used to estimate the movement distance and the movement direction of the mobile robot 100, or in other words, the current location. If there is no response from the environmental sensor node 120 in step S204, the mapping and localization unit 104 conducts the generation of map information and the estimation of the location of the mobile robot 100 using the information acquired by the external sensor 101 in step S202, and the information acquired by the internal sensor 102 in step S201. The generation of map information and the estimation of location are conducted at the same time by a filtering process in the mapping and localization unit 104.

Next, in step S209, the path planning unit 106 uses the map information generated in step S208 and saved in the map information database 105 to plan a path by which to move from the current location. The path planning method is as discussed earlier.

Next, in step S210, the control unit 107 generates a control command for conducting the movement operations of the mobile robot 100 for the path planned in step S209.

Next, in step S211, the actuator 108 receives the control command generated in step S210, and actually moves the mobile robot 100.

Hereinafter, the process from step S221 to S227 in the environmental sensor node 120 will be described.

In step S221 of the process flow T221A, the communication unit 125 of the environmental sensor node 120 receives a query from the mobile robot 100.

In step S223, the moving object movement and environmental change information database 124 is used to check whether or not there exists moving object movement and environmental change information corresponding to the content of the query from the mobile robot 100, namely the condition of a specified place and a specified time period. If the result of the check is that moving object movement and environmental change information corresponding to the condition exists, the process proceeds to step S225. If moving object movement and environmental change information corresponding to the condition does not exist, the process returns to step S221.

Next, in step S225, the communication unit 125 transmits to the mobile robot 100 a response to the query in step S203 about whether or not there exists moving object movement and environmental change information for the specified place and time period (information about whether or not moving object movement and environmental change information for the specified place exists).

Next, in step S226, the communication unit 125 transmits moving object movement and environmental change information to the mobile robot 100 that issued the query received in step S221. After the transmission is conducted, the process returns to step S221.

In step S222 of the process flow 221B, the moving object movement and environmental change information extraction unit 122 acquires information about the surroundings of the environmental sensor node 120 detected by the environmental sensor 121, and saves the acquired information in the environmental sensor information time series database 123, in a time series in the form of a pair of a detection time and detection information.

In step S224, the moving object movement and environmental change information extraction unit 122 references multiple pairs of a detection time and detection information regarding the surroundings of the environmental sensor node 120 following the time series saved in the environmental sensor information time series database 123, and determines whether or not the environment around the environmental sensor node 120 has changed.

In step S227, the moving object movement and environmental change information extraction unit 122 calculates the changed place in the surrounding environment, the changed shape, the magnitude of the change, and the time taken for the change, based on multiple pairs of a detection time and detection information following the time series saved in the environmental sensor information time series database 123. The changed place, the magnitude of the change, and the time taken for the change are saved in the moving object movement and environmental change information database 124 as moving object movement and environmental change information.

As illustrated in FIG. 2, the extracted moving object movement and environmental change information is sent to the mobile robot from the environmental sensor node over a communication link 353 by a communication means 351 onboard the environmental sensor node and a communication means 352 onboard the mobile robot 100. The moving object movement and environmental change information sent to the mobile robot is used by the moving object and environmental change information integration unit to remove information about the place in the information detected by the external sensor 101 of the mobile robot 100 (second map information) corresponding to the place for which environmental change information exists due to a person or moving object. Consequently, it becomes possible to remove dynamic environmental changes that act as disturbances from the information detected by the external sensor 101 of the mobile robot 100.

Figure 4A:
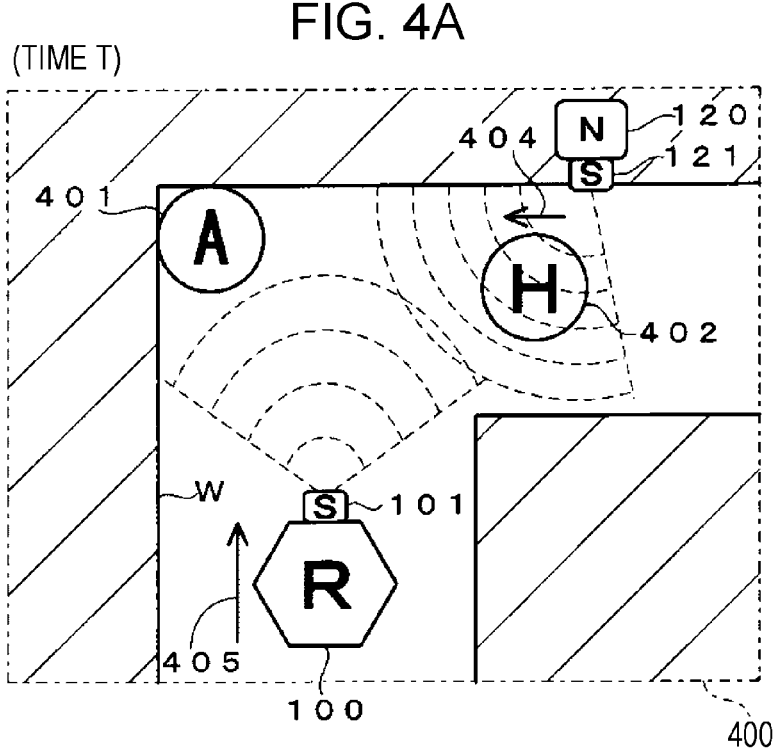
FIG. 4A is a diagram illustrating an example of an environment including a mobile robot at a time T.

FIG. 4A illustrates, as an example, the mobile robot 100 existing in an environment 400 at an arbitrary time T. FIG. 4C illustrates information (sensor data) 430 acquired by the external sensor 101 of the mobile robot 100 at the time T.

Figure 4B:
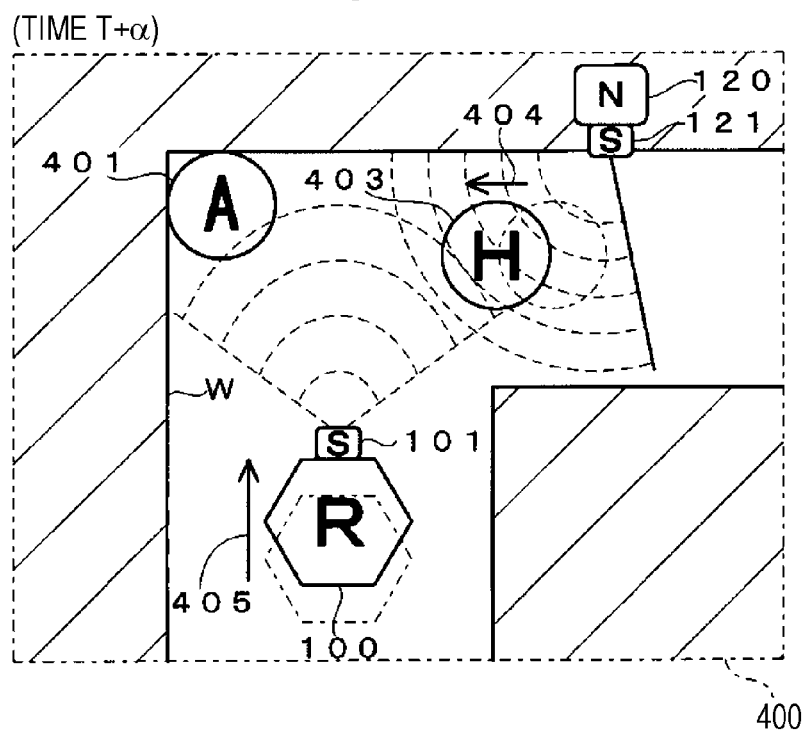
FIG. 4B is an explanatory diagram illustrating an example of an environment including a mobile robot at a time T+α.
Figure 4C:
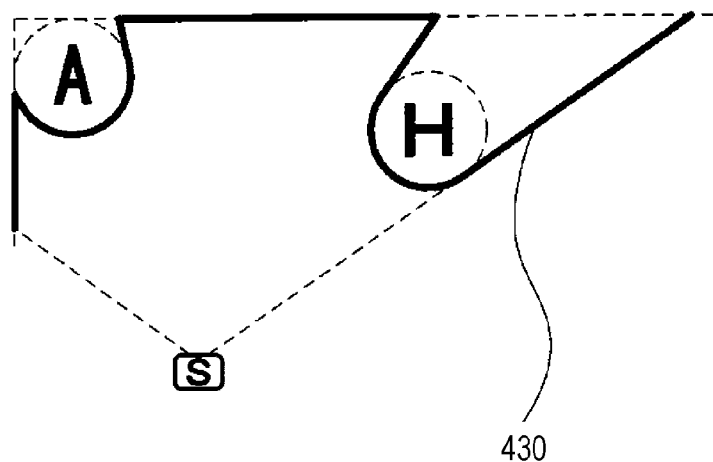
FIG. 4C is a diagram illustrating an example of sensor data acquired by a mobile robot at a time T.

FIG. 4B illustrates the mobile robot 100 existing in the environment 400 at a time T+α after an arbitrary time interval a elapses from the time T. FIG. 4O illustrates information (sensor data) 431 acquired by the external sensor 101 of the mobile robot 100 at the time T+α after the arbitrary time interval a elapses from the time T.

As illustrated in FIG. 4A, in the environment 400, there exist the mobile robot 100, a stationary object A existing at a position 401, a moving object H existing at a position 402, and the environmental sensor node 120. The mobile robot 100 is moving in a forward direction 405. The moving object H is moving from the position 402 in a forward direction 404.

As illustrated in FIG. 4B, in the environment 400, there exist the mobile robot 100, the stationary object A existing at the position 401, the moving object H existing at a position 403, and the environmental sensor node 120.

Comparing FIG. 4A and FIG. 4B, the position of the mobile robot 100 has changed. Additionally, the position of the moving object H has also changed from the position 402 to the position 403.

The external sensor 101 onboard the mobile robot 100 acquires information about the surroundings of the mobile robot 100 in the environment 400.

FIG. 4C illustrates the sensor data 430 (bold line) acquired by the external sensor 101 for the environment 400 at the time T. The sensor data 430 includes the stationary object A existing at the position 401, the moving object H existing at the position 402, as well as the respective shapes of walls W and their respective distances from the external sensor 101 in the environment 400.

Figure 4D:
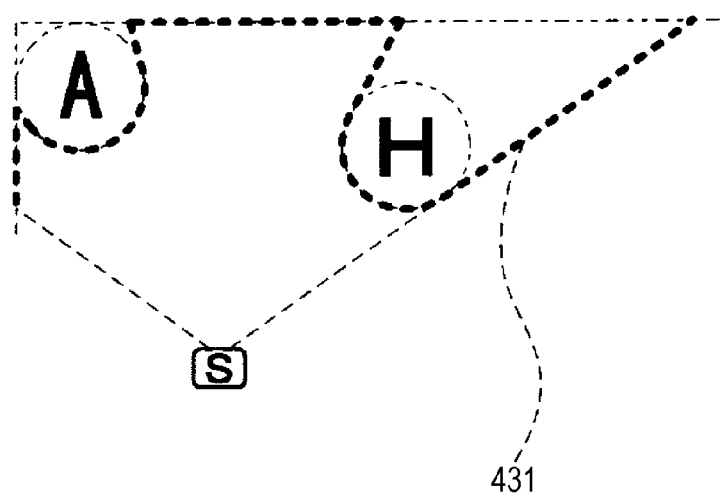
FIG. 4D is a diagram illustrating an example of sensor data acquired by a mobile robot at a time T+α.

FIG. 4D illustrates the sensor data 431 (bold dashed line) acquired by the external sensor 101 for the environment 400 at the time T+α after the arbitrary time interval a elapses from the time T. The sensor data 431 includes the stationary object A existing at the position 401, the moving object H existing at the position 403, as well as the respective shapes of walls W and their respective distances from the external sensor 101 in the environment 400.

Figure 5C:
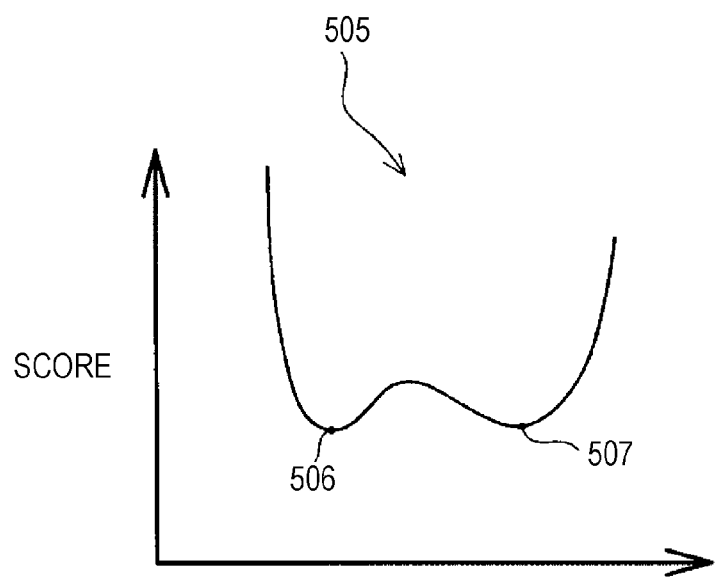
FIG. 5C is a diagram illustrating an example of a matching score value.

The sensor data 430 and the sensor data 431 may include data formats such as two-dimensional distance data, three-dimensional distance data, two-dimensional shape data, three-dimensional shape data, image feature points, or a combination of all of the above. In other words, the information acquired by the external sensor 101 includes coordinate information. The environmental sensor node 120 uses the environmental sensor 121 to extract environmental changes caused by the moving object H moving from the position 402 to the position 403 in the interval from the time T to the time T+α as moving object movement and environmental change information. FIGS. 5A to 5C illustrate a matching process between the map data at the time T and the sensor data at the time T+α, and example results.

The sensor data matching process is executed by the mapping and localization unit 104 in step S208 discussed above. The matching process checks the map information (data) and the sensor data acquired by the external sensor against each other, conducts a search for a transform having a high similarity, and uses the transform having the highest similarity to estimate the movement distance and the movement direction of the mobile robot 100, or in other words, the current location.

As an example, a matching process between the map data 501 at the time T created based on the sensor data 430 (in other words, the map information inside the map information database 105) and the sensor data 431 acquired by the external sensor 101 of the mobile robot 100 at the time T+α will be described.

The matching process is a process of checking multiple sets of data against each other, and searching for a transform between the multiple sets of data with low dissimilarity, or in other words, high similarity. The matching process calculates a gradient of dissimilarity, and searches for a transform for which the dissimilarity is a minimum.

However, if the shape of the target to search changes shape, or if noise due to a disturbance enters the data, a problem occurs in that the dissimilarity does not fall below a predetermined dissimilarity threshold, and the search does not converge. Furthermore, in such cases, a problem occurs in that an incorrect correspondence different from the correspondence between the data that would have been correct originally is determined to be the optimal correspondence, and the accuracy of the transform search falls.

The matching result between the map data 501 and the sensor data 431 by the matching process may become like the example result 503 and the example result 504 illustrated in FIG. 5B.

The example result 504 illustrates an example that is extremely close to the ground truth as the correspondence between the map data 501 and the sensor data 431.

In the example result 504, the portion of the data from the stationary object A that does not move from the position 401 and the shape of the walls (the left-side portion) corresponds with high accuracy, and accurately corresponds to the ground truth. On the other hand, the portion in which the shape of the sensor data changed due to the movement of the moving object H from the position 402 to the position 403 (the right-side portion) does not correspond well, and as a result, the similarity of the sensor data as a whole is lowered.

For this reason, depending on the search method and the threshold, a problem occurs in that the number of iterations of the matching calculation increases until convergence is reached on the example result 504 that is correct.

FIG. 5C illustrates an example score 505 for matching. As the example score 505, an example is illustrated in which the distance in the X-axis direction between two sets of data 501 and 431 to match is plotted on the horizontal axis, and the score is plotted on the vertical axis. The score expresses the dissimilarity between the data, and takes a low value as the shape of the data matches better.

At this point, for the sake of comprehension, the example score 505 illustrates an example for the case in which the sensor data 431 is translated only in the X-axis direction with respect to the map data 501. Note that in actuality, translations and rotations of the data with respect to each axis may be conducted to search for a transform. Translation herein refers to an action of moving parallel in one direction.

As illustrated in FIG. 5C, in the example score 505 for matching, a score 507 of the matching calculation with respect to the example result 504 is illustrated. In the vicinity of the score 507, the change in the score is smooth, and in the case of computing a result by using a technique such as the gradient method, a large number of iterations of the matching calculation becomes necessary until convergence on a result is reached.

In addition, the example result 503 illustrated in FIG. 5B illustrates an example of a low correspondence with the ground truth as the correspondence between the map data 501 and the sensor data 431. As illustrated in FIG. 5C, in the example score 505 for matching, a score 506 of the matching calculation with respect to the example result 503 is illustrated. In the example score 505, the score 506 is a local minimum. For this reason, in the case of computing a result by using a technique such as the gradient method, the result converges on the score 506, and the example result 503, which has a low correspondence with the ground truth, is incorrectly determined to be the optimal result. In this way, the problem of converging on the example result 503 and incorrectly determining that a low correspondence with the ground truth is optimal may also occur.

Consequently, the search accuracy for a transform between data is lowered, and as a result, the map generation accuracy and the location estimation accuracy of the mobile robot 100 based on such a map are lowered.

In this way, if a change occurs in the shape of the sensor data due to the movement of a moving object, a problem occurs in that the number of iterations of the matching calculation increases, and by incorrectly judging a low correspondence with the ground truth to be optimal, the map generation accuracy and the location estimation accuracy of the mobile robot 100 are lowered. Hereinafter, two processes addressing this problem will be described with reference to FIGS. 6A to 6C and FIGS. 7A to 7C.

Figure 6A:
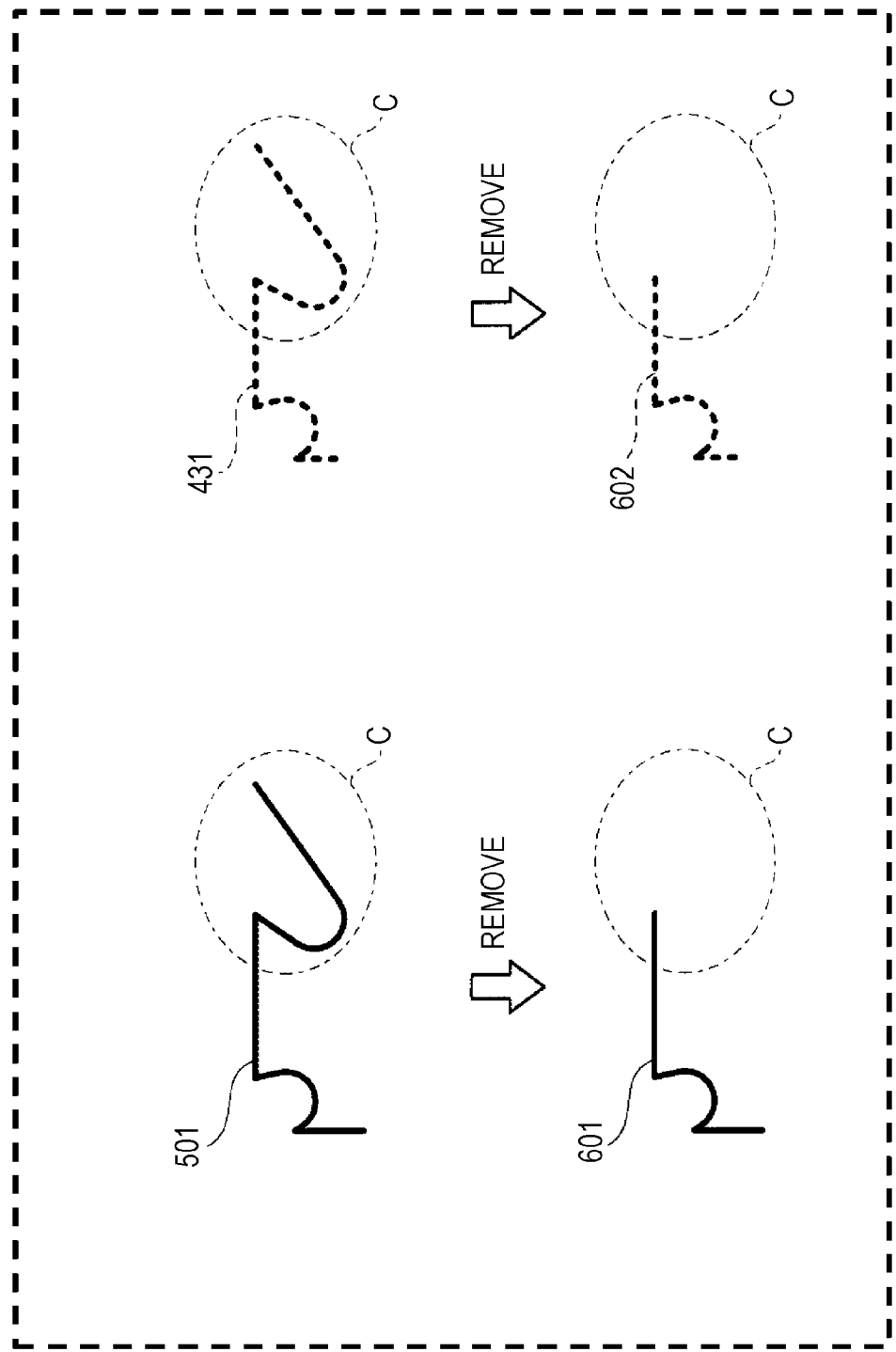
FIG. 6A is a diagram illustrating an example of a data removal process.

FIG. 6A is a diagram illustrating an example of a data removal process. FIG. 6A illustrates conducting a first process, namely a process of removing the data of a place (region C) in which moving object movement and environmental change information exists due to the movement of the moving object H, which results in map data 601 at the time T and sensor data 602 at the time T+α after the process of removing the data of the target place is conducted.

Note that the process illustrated in FIG. 6A is the same process as step S20705. In other words, the region C illustrated in FIG. 6A corresponds to a place in which the change over time is greater than the threshold value Th_ch.

Figure 6B:
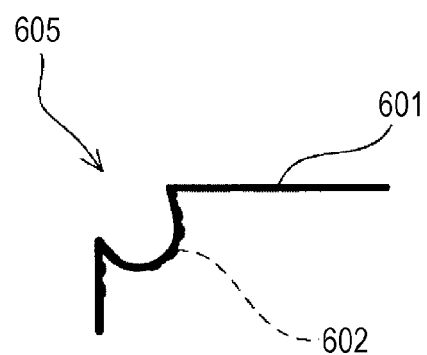
FIG. 6B is a diagram illustrating an example of a matching result of data after a removal process.
Figure 6C:
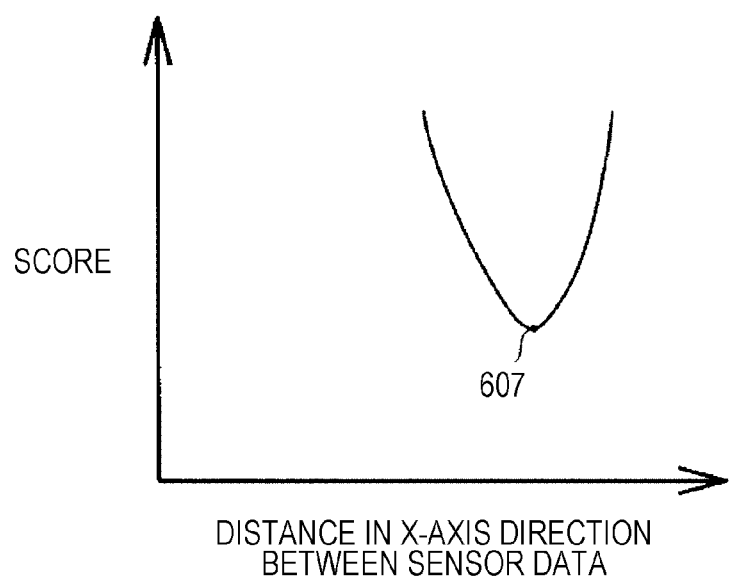
FIG. 6C is a diagram illustrating an example of a matching score value of data after a removal process.

FIGS. 6B and 6C illustrate an example matching result and an example matching score of the map data 601 and the sensor data 602. At this point, for the sake of comprehension, the example matching score illustrates an example for the case in which the sensor data 602 is translated only in the X-axis direction with respect to the map data 601. In other words, in the graph of FIG. 6O, the horizontal axis represents the distance in the X-axis direction between the two sets of data 601 and 602, while the vertical axis represents the score (the dissimilarity between the two sets of data 601 and 602).

As illustrated in FIG. 6C, according to the removal process illustrated in FIG. 6A, the effects of the change in the shape of the sensor data caused by the movement of the moving object are removed, and thus the change in the score becomes steeper. Thus, in the case of computing a result by using a technique such as the gradient method, a local minimum corresponding to the point of the score 506 does not exist in the example score illustrated in FIG. 6C compared to the example score 505 illustrated in FIG. 5C. In other words, in the example score illustrated in FIG. 6C, only the minimum corresponding to the point of the score 607 exists as a local minimum. According to this example score, an incorrect judgment may be avoided, and an accurate correspondence with the ground truth is possible. Furthermore, the change in the score near the score 607 is steep compared to the score 507 illustrated in FIG. 5O, thereby reducing the number of iterations of the matching calculation compared to the case of using the example score 505 illustrated in FIG. 5C.

According to the above, in a data matching process for mapping and localization, by removing information about a region (the region C illustrated in FIG. 6A) in which a moving object exists in each of two sets of data to match before executing the matching process, the accuracy of the matching process may be increased while also reducing the computational complexity of the matching process.

Next, the second process will be described. FIG. 7A is a diagram illustrating an example of a data variance-increasing process. FIG. 7A illustrates conducting a process of increasing the variance of the data of a place (region C) in which moving object movement and environmental change information exists due to the movement of the moving object H, which results in map data 603 at the time T and sensor data 604 at the time T+α after the process of increasing the variance of the data of the target place is conducted.

At this point, increasing the variance of information will be described further with reference to FIGS. 8 to 10.

Figure 8:
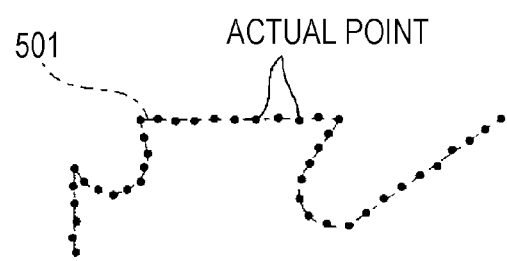
FIG. 8 is a diagram illustrating map data at a time T.
Figure 9:
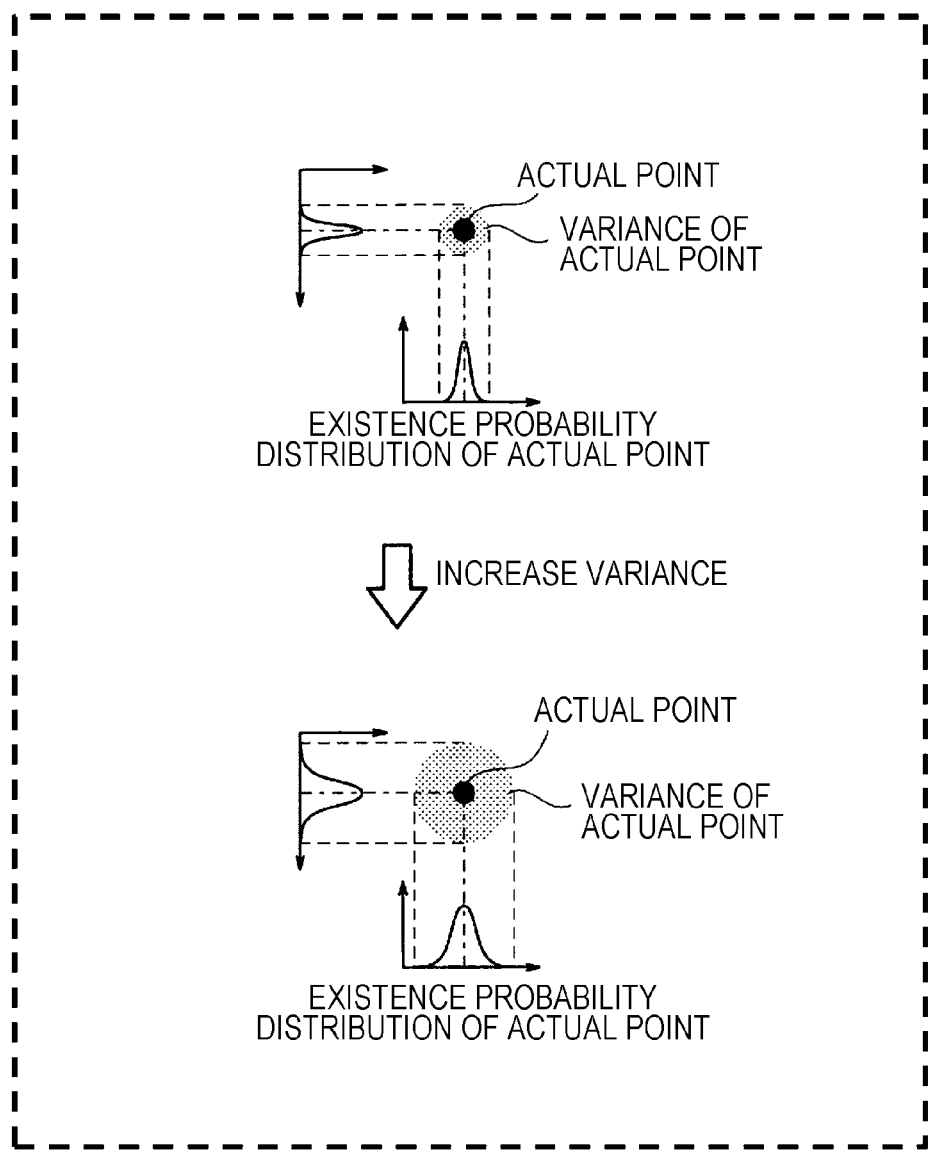
FIG. 9 is a diagram for explaining an example of a variance-increasing process.

FIG. 8 illustrates the map data 501 at the time T. As illustrated in FIG. 8, the map data 501 includes actual points (actual coordinates) actually observed by the external sensor 101 of the mobile robot 100.

The variance of the information of the map data 501 may be treated as the variance of the actual points, and express the indefiniteness of the actual points (the trustworthiness of the coordinate information). As illustrated in FIG. 9, the variance of an actual point may be defined specifically as the width of an existence probability distribution having a peak at the actual point. Consequently, increasing the variance of the information means increasing the width of the existence probability distribution having a peak at the actual point.

Figure 10:
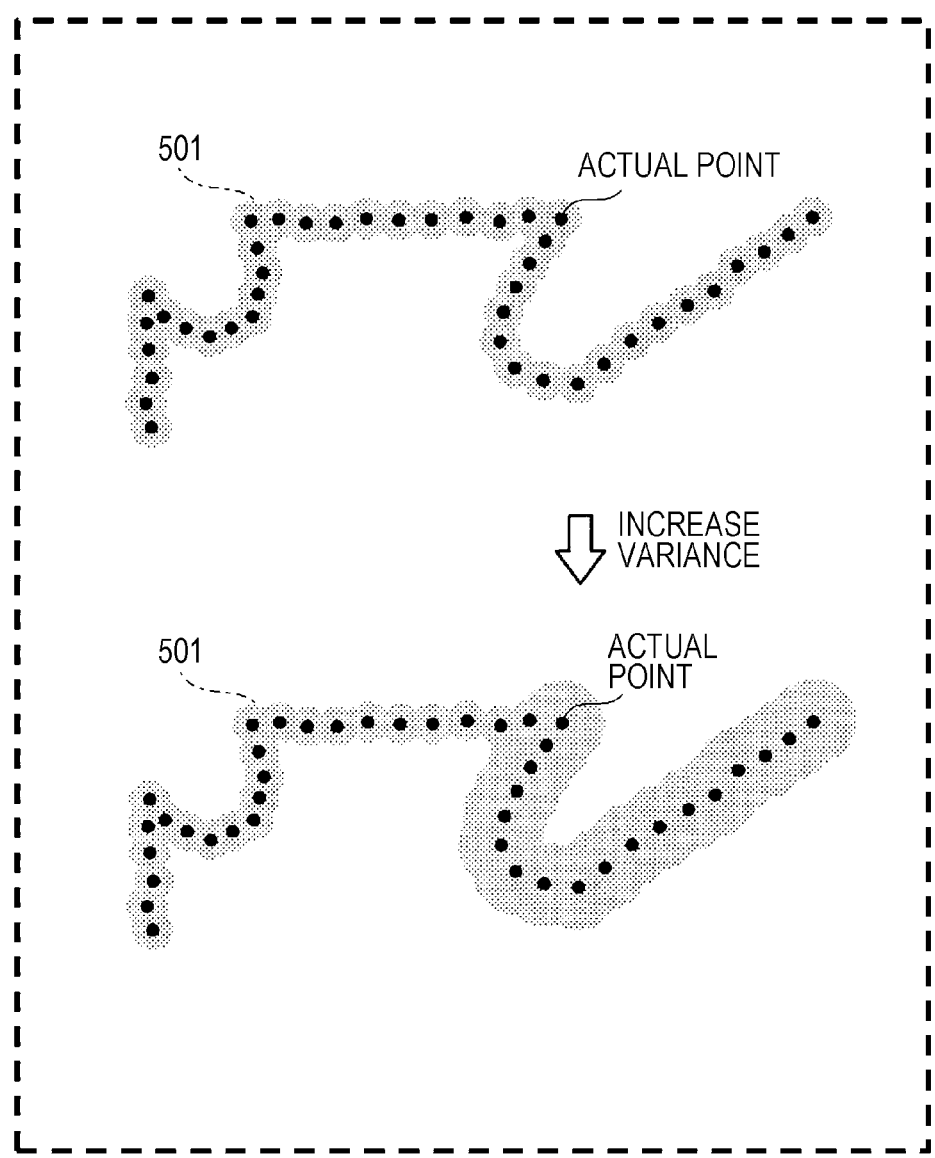
FIG. 10 is a diagram illustrating an example of a result of a variance-increasing process.

As an example, FIG. 10 illustrates how the variance of information is increased for a portion of the map data 501 (right-side portion), or in other words, how the width of the existence probability distribution of the actual points is increased.

Note that the process illustrated in FIG. 7A is the same process as step S20706. In other words, the region C illustrated in FIG. 7A corresponds to a place in which the change over time is greater than the threshold value Th_ch.

Figure 7B:
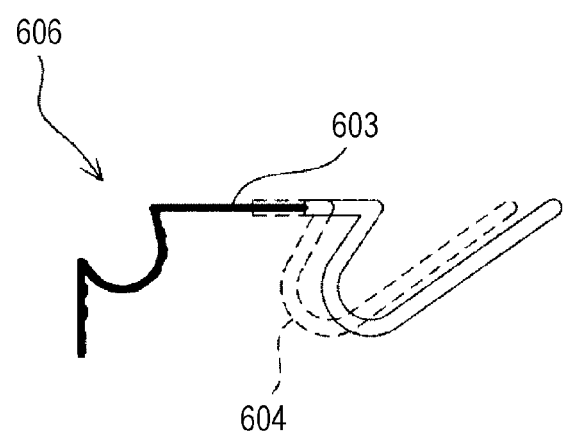
FIG. 7B is a diagram illustrating an example of a matching result of data after a variance-increasing process.
Figure 7C:
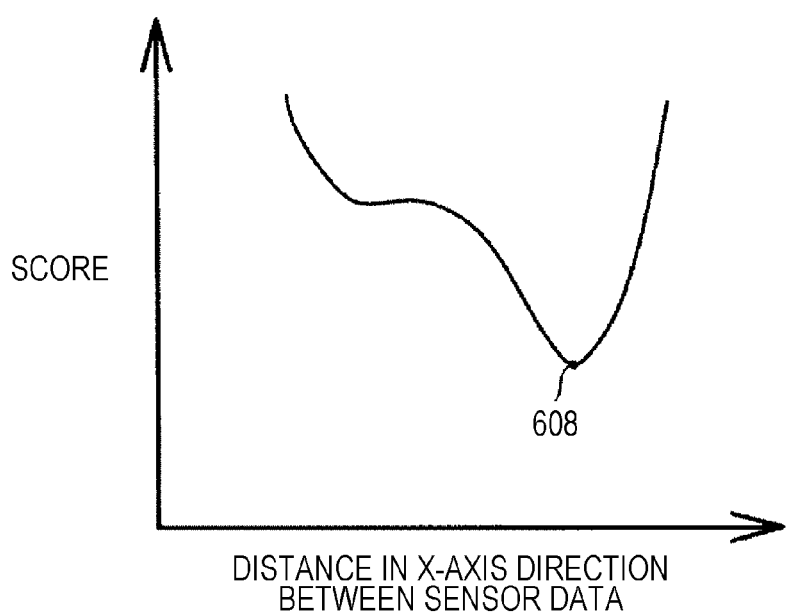
FIG. 7C is a diagram illustrating an example of a matching score value of data after a variance-increasing process.

FIGS. 7B and 7C illustrate an example matching result and an example matching score of the map data 603 and the sensor data 604. At this point, for the sake of comprehension, the example matching score illustrates an example for the case in which the sensor data 604 is translated only in the X-axis direction with respect to the map data 603.

As illustrated in FIG. 7C, according to the variance-increasing process illustrated in FIG. 7A, the effects of the change in the shape of the sensor data caused by the movement of the moving object are relaxed, and thus the change in the score becomes steeper. Thus, in the case of computing a result by using a technique such as the gradient method, the local minimum corresponding to the point of the score 506 in the example score 505 illustrated in FIG. 5O becomes a sufficiently large value compared to the point of the score 608, and thus convergence is reached more readily on the score 608 compared to the example score 505 in FIG. 5C. According to this example score, an incorrect judgment may be avoided more easily, and an accurate correspondence with the ground truth is possible. Furthermore, the change in the score near the score 608 is steep compared to the score 507 illustrated in FIG. 5C, thereby reducing the number of iterations of the matching calculation compared to the case of using the example score 505 illustrated in FIG. 5C.

According to the above, in a data matching process for mapping and localization, by increasing the variance of information about a region (the region C illustrated in FIG. 7A, for example) in which a moving object exists in each of two sets of data to match before executing the matching process, the accuracy of the matching process may be increased while also reducing the computational complexity of the matching process.

The information removal process illustrated in FIG. 6A and the information variance-increasing process illustrated in FIG. 7A are used in different situations depending on a condition, as illustrated in FIG. 3B. Specifically, if there exists a place in which the change over time between the first timing and the second timing is greater than the threshold value Th_ch (if there is a place in which such moving object movement and environmental change information exists), and if the time difference between the first timing and the second timing is less than the threshold value Th_tb (second time), or in other words, if the effects due to the movement of a moving object or the change in the environment are judged to be relatively large, the removal process is executed in step S20705. On the other hand, if the time difference between the first timing and the second timing is greater than the threshold value Th_tb, or in other words, if the effects due to the movement of a moving object or the change in the environment are judged to be relatively small, the variance-increasing process is executed in step S20706.

Compared to the variance-increasing process, the removal process is a suppressing process that reduces the effects due to the movement of a moving object or the change in the environment. In this way, in the present embodiment, the removal process and the variance-increasing process are used in different situations depending on the degree of the effects due to the movement of a moving object or the change in the environment, thereby realizing a matching process between data using an optimal technique.

According to Embodiment 1, it is possible to conduct mapping, and localization of a mobile robot moving by using the map, accurately and robustly, even in a space with large environmental changes.

Embodiment 2

The robot system according to Embodiment 1 above includes one mobile robot, and at least one environmental sensor node. In contrast, a robot system according to Embodiment 2 includes multiple mobile robots, and at least one environmental sensor node. Additionally, each of the multiple mobile robots is equipped with functions similar to the environmental sensor node in Embodiment 1 above. In other words, with respect to one mobile robot conducting mapping and localization, the remaining mobile robots are able to function as environmental sensor nodes.

Specifically, each mobile robot in Embodiment 2 is configured to acquire moving object movement and environmental change information ultimately by using an external sensor, similarly to the environmental sensor node of Embodiment 1 above that acquires moving object movement and environmental change information ultimately by using an environmental sensor. Also, the mobile robot includes structural elements that are substantially the same as the moving object movement and environmental change information extraction unit, the environmental sensor information time series database, and the moving object movement and environmental change information database of the environmental sensor node illustrated in FIG. 1.

Figure 11:
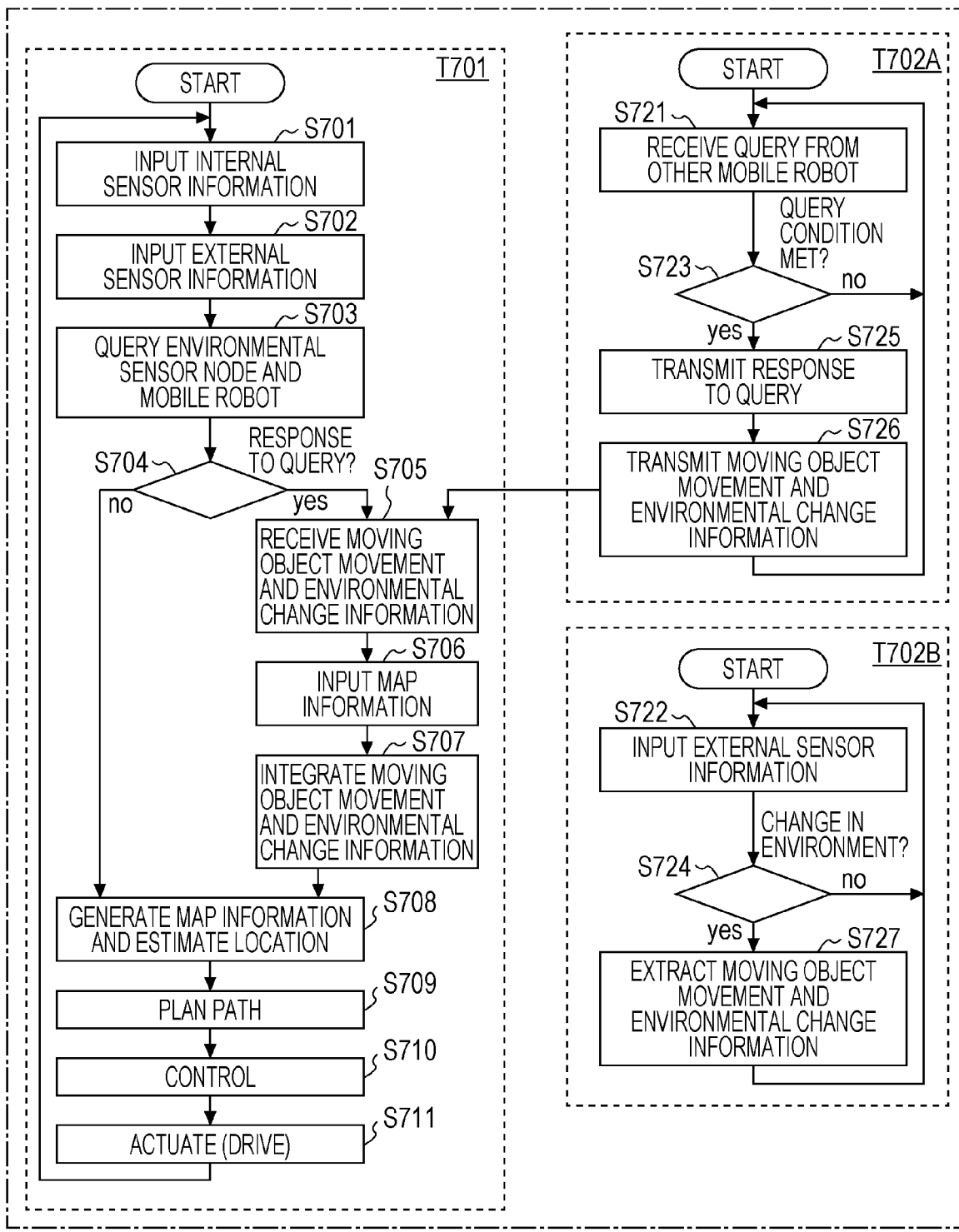
FIG. 11 is a flowchart illustrating an example of a process by a robot system according to Embodiment 2.

FIG. 11 is a flowchart illustrating an example of a process by multiple mobile robots in the robot system according to Embodiment 2.

As illustrated in FIG. 11, a mobile robot according to Embodiment 2 is configured to operate according to a main process flow T701, and sub process flows T702A and T702B. Also, FIG. 11 illustrates the exchange of information between a robot that executes the main process flow (corresponding to the mobile robot 100 of Embodiment 1 above) and at least one other mobile robot that executes the sub process flows T702A and T702B (a robot that functions as the environmental sensor node 120 of Embodiment 1 above).

The differences between the robot system according to Embodiment 2 that conducts the process flows illustrated in FIG. 11 and the robot system according to Embodiment 1 above illustrated in FIGS. 3A and 3B are that the moving object movement and environmental change information is extracted by a mobile robot that executes the process flows T702A and T702B to act as an environmental sensor node, and transmitted from that robot to the mobile robot that executes the main process flow to conduct mapping and localization, and that the mobile robot that acts as an environmental sensor node uses the external sensor to acquire information about the surroundings.

According to Embodiment 2, and similarly to Embodiment 1 above, it is possible to conduct mapping, and localization of a mobile robot moving by using the map, accurately and robustly, even in a space with large environmental changes. Additionally, by having a mobile robot able to move around act as an environmental sensor node, the area over which moving object movement and environmental change is detectable may be expanded, thereby correspondingly increasing the amount of information in the moving object movement and environmental change information (compared to a robot system with one or more stationary environmental sensor nodes). As a result, reduced accuracy of estimation values in the process of mapping and localization may be inhibited, and increases in the computational complexity due to disturbances may be inhibited.

Note that in the case of Embodiment 2, any of the multiple mobile robots fulfills the role of an environmental sensor node, and thus it is also possible to remove at least one environmental sensor node itself from the robot system. In other words, in this case, the robot system does not include an environmental sensor node, but instead includes at least two mobile robots able to fulfill the role of the environmental sensor node.

Note that the technology described in the foregoing aspects may be realized in the following robot system categories, for example. However, the robot system categories for realizing the technology described in the foregoing aspects are not limited to the following.

The foregoing thus describes processes of the present disclosure by way of exemplary embodiments, but the primary agents and devices by which each process is performed are not particularly limited. A process may be executed by a processor or the like (described below) embedded into a specific device disposed locally. Additionally, a process may also be executed by a cloud server or the like disposed in a different location from a local device. Additionally, each process described in the present disclosure may also be executed in a distributed manner by linking information between a local device and a cloud server. Hereinafter, aspects of the present disclosure will be described.

(1) The above device is specifically a computer system made up of a microprocessor, ROM, RAM, a hard disk unit, a display unit, a keyboard, a mouse, and the like. A computer program is stored in the RAM or the hard disk unit. Each device achieves the respective functions thereof as a result of the microprocessor operating in accordance with the computer program. The computer program herein is made up of a plural combination of instruction codes indicating commands to the computer in order to achieve a designated function.

(2) Some or all of the structural elements constituting the above device may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is stored in the RAM. The system LSI chip achieves the functions thereof as a result of the microprocessor operating in accordance with the computer program.

(3) Some or all of the structural elements constituting the above device may also be configured as an IC card or a separate module that may be inserted into the device. The IC card or the module is a computer system made up of a microprocessor, ROM, RAM, and the like. The IC card or the module may also include the advanced multi-function LSI chip discussed above. The IC card or module achieves the functions thereof as a result of the microprocessor operating in accordance with the computer program. The IC card or the module may also be tamper-resistant.

(4) The present disclosure may also be taken to be the methods indicated in the foregoing. In addition, these methods may be taken to be a computer program realized by a computer, or a digital signal containing the computer program.

(5) In addition, the present disclosure may also be realized by recording the computer program or the digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example. In addition, one aspect of the present disclosure may also be taken to be the digital signal recorded on these recording media.

In addition, the present disclosure may also be realized by transmitting the computer program or the digital signal over an electrical communication link, a wired or wireless communication link, a network such as the Internet, or a data broadcast.

In addition, the present disclosure may also be a computer system equipped with a microprocessor and memory, in which the memory stores the above computer program, and the microprocessor operates according to the computer program.

In addition, one aspect of the present disclosure may also be carried out by another independent computer system by recording and transporting the program or the digital signal on a recording medium, or transporting the program or the digital signal over a medium such as a network.

(6) The foregoing embodiments and their modifications may also be combined with each other.

Finally, the mobile robot and the environmental sensor node may be realized in a variety of aspects. For example, the mobile robot 100 and the environmental sensor node 120 (312 to 319) illustrated in FIG. 2 are used indoors, but are not limited thereto. For example, an aspect in which the mobile robot is a wheeled vehicle that drives autonomously on an outdoor road or the like is also possible. In this case, the environmental sensor node is disposed along the road like a traffic sign, or alternatively, provided in a building near the road.

The present disclosure is applicable to a mapping method, a localization method, a robot system, and a robot.

What is claimed is:

1. A mapping method of a mobile robot that conducts mapping using at least one or a plurality of an environmental sensor node, the mapping method comprising:
   acquiring first map information created in advance, including information about a surrounding area of the mobile robot;
   acquiring second map information including information about the surrounding area of the mobile robot by an external sensor onboard the mobile robot;
   receiving third map information including information about the surrounding area of the mobile robot from the environmental sensor node;
   (i) in the third map information, if information exists about a place in which an amount of change over time is equal to or greater than a certain threshold value,
   conducting a removal process of removing information about a place in the first map information and information about a place in the second map information that correspond to the place in which the amount of change over time is equal to or greater than the certain threshold value in the third map information, or alternatively,
   conducting a variance-increasing process of increasing a variance of each of information about a place in the first map information and information about a place in the second map information that correspond to the place in which the amount of change over time is equal to or greater than the certain threshold value in the third map information;
   (ii) matching the first map information and the second map information after being subjected to the removal process or the variance-increasing process, and generating map information based on the matching result; and
   (iii) updating the first map information to the map information generated based on the matching result.

2. The mapping method according to claim 1, wherein
   in the third map information, if information exists about a place in which the amount of change over time between a first timing and a second timing is equal to or greater than the certain threshold value,
   the removal process is conducted if a time difference between the first timing and the second timing is within a range between a first time and a second time longer than the first time, and
   the variance-increasing process is conducted if the time difference between the first timing and the second timing is equal to or greater than the second time.

3. The mapping method according to claim 2, wherein
   in the third map information, if information exists about a place in which the amount of change over time between the first timing and the second timing is equal to or greater than the certain threshold value,
   if the time difference between the first timing and the second timing is less than or equal to the first time, the removal process and the variance-increasing process are not conducted, the first map information and the second map information are matched, and map information is generated based on the matching result.

4. The mapping method according to claim 1, wherein
   in the third map information, if information does not exist about a place in which the amount of change over time is equal to or greater than the certain threshold value,
   the first map information and the second map information are matched, and map information is generated based on the matching result.

5. The mapping method according to claim 1, wherein
   the variance-increasing process is a process of increasing an indefiniteness of information about a corresponding place in the first map information and a corresponding place in the second map information.

6. The mapping method according to claim 1, wherein
   the third map information includes information about an existence probability of an object near the environmental sensor node, and
   the amount of change over time is an amount of change in the existence probability.

7. The mapping method according to claim 1, wherein
   the first map information, the second map information, and the third map information are coordinate information in a two-dimensional coordinate system or coordinate information in a three-dimensional coordinate system, and
   before conducting the matching, a coordinate conversion process is conducted to convert the respective coordinate systems of the first map information, the second map information, and the third map information to a common coordinate system.

8. A localization method of a mobile robot that conducts localization using at least one sensor node, the localization method comprising:
   acquiring first map information created in advance, including information about a surrounding area of the mobile robot;
   acquiring second map information including information about the surrounding area of the mobile robot by an external sensor onboard the mobile robot;
   receiving third map information including information about the surrounding area of the mobile robot from an environmental sensor node;
   (i) in the third map information, if information exists about a place in which an amount of change over time is equal to or greater than a certain threshold value,
   conducting a removal process of removing information about a place in the first map information and information about a place in the second map information that correspond to the place in which the amount of change over time is equal to or greater than the certain threshold value in the third map information, or alternatively,
   conducting a variance-increasing process of increasing a variance of each of information about a place in the first map information and information about a place in the second map information that correspond to the place in which the amount of change over time is equal to or greater than the certain threshold value in the third map information;
   (ii) matching the first map information and the second map information after being subjected to the removal process or the variance-increasing process, and generating map information based on the matching result;
   (iii) updating the first map information to the map information generated based on the matching result; and
   (iv) estimating a location of the mobile robot in the updated first map information, based on the updated first map information, and a detection result of an internal sensor that detects at least one of a position and an orientation of the mobile robot.

9. The localization method according to claim 8, further comprising:
   calculating a movement path based on the updated first map information and the estimated location; and
   causing the mobile robot along the movement path.

10. A robot system comprising:
at least one environmental sensor node; and
a mobile robot, wherein
the environmental sensor node acquires third map information including information about a surrounding area of the mobile robot,
the mobile robot includes
- a database recording first map information created in advance, including information about a surrounding area of the mobile robot,
- an external sensor that acquires second map information including information about the surrounding area of the mobile robot,
- a communicator that communicates with the environmental sensor node to acquire the third map information, and
- an information processor that
    (i) in the third map information, if information exists about a place in which an amount of change over time is equal to or greater than a certain threshold value,
    conducts a removal process of removing information about a place in the first map information and information about a place in the second map information that correspond to the place in which the amount of change over time is equal to or greater than the certain threshold value in the third map information, or alternatively,
    conducts a variance-increasing process of increasing a variance of each of information about a place in the first map information and information about a place in the second map information that correspond to the place in which the amount of change over time is equal to or greater than the certain threshold value in the third map information,
    (ii) matches the first map information and the second map information after being subjected to the removal process or the variance-increasing process, and generates map information based on the matching result, and
    (iii) updates the first map information recorded in advance to the map information generated based on the matching result.

11. A mobile robot, comprising:
a database recording first map information created in advance, including information about a surrounding area of the mobile robot;
an external sensor that acquires second map information including information about the surrounding area of the mobile robot;
a communicator that acquires third map information including information about the surrounding area of the mobile robot by communicating with at least one environmental sensor node, which is external to the mobile robot and which acquires the third map information; and
an information processor that
    (i) in the third map information, if information exists about a place in which an amount of change over time is equal to or greater than a certain threshold value,
    conducts a removal process of removing information about a place in the first map information and information about a place in the second map information that correspond to the place in which the amount of change over time is equal to or greater than the certain threshold value in the third map information, or alternatively,
    conducts a variance-increasing process of increasing a variance of each of information about a place in the first map information and information about a place in the second map information that correspond to the place in which the amount of change over time is equal to or greater than the certain threshold value in the third map information,
    (ii) matches the first map information and the second map information after being subjected to the removal process or the variance-increasing process, and generates map information based on the matching result, and
    (iii) updates the first map information recorded in advance to the map information generated based on the matching result.

* * * * *